(12) United States Patent
Lee et al.

(10) Patent No.: US 11,483,708 B2
(45) Date of Patent: Oct. 25, 2022

(54) NETWORK ACCESS TOKENS FOR ACCESSORIES

(71) Applicant: Apple Inc., Cupertino, CA (US)

(72) Inventors: Wayne A. Lee, San Francisco, CA (US); Zaka Ur Rehman Ashraf, Pleasanton, CA (US); Daniel R. Borges, San Francisco, CA (US); Kyle C. Brogle, San Francisco, CA (US); Srinivas Rama, Cupertino, CA (US); Benjamin S. Turner, San Francisco, CA (US); Hung Q. Le, Mountain View, CA (US); Devin E. Gund, San Francisco, CA (US); Keith W. Rauenbuehler, San Francisco, CA (US); Praveen Chegondi, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 16/789,990

(22) Filed: Feb. 13, 2020

(65) Prior Publication Data
US 2020/0267552 A1 Aug. 20, 2020

Related U.S. Application Data

(60) Provisional application No. 62/853,531, filed on May 28, 2019, provisional application No. 62/853,537, (Continued)

(51) Int. Cl.
*H04W 12/00* (2021.01)
*H04L 29/00* (2006.01)
(Continued)

(52) U.S. Cl.
CPC ........ *H04W 12/068* (2021.01); *H04L 63/083* (2013.01); *H04L 63/0853* (2013.01)

(58) Field of Classification Search
CPC ... H04W 12/068; H04W 12/08; H04W 12/55; H04L 63/083; H04L 63/0853; H04L 63/0807
See application file for complete search history.

(56) References Cited

U.S. PATENT DOCUMENTS

2007/0186105 A1* 8/2007 Bailey .................. H04L 9/3234
713/168
2014/0059351 A1* 2/2014 Braskich ............... H04W 12/04
713/171
(Continued)

*Primary Examiner* — Alexander Lagor
(74) *Attorney, Agent, or Firm* — Kilpatrick Townsend & Stockton LLP

(57) ABSTRACT

A controller device within a home network (or any suitable network) can be configured to manage network access tokens for various accessory devices within the home network. These network access tokens can be used by the accessory devices to access the home network without needing the network owner's network password. The network access tokens can be revocable and/or for a limited time. The controller device can generate the network access tokens, and can provide them to the accessory devices (or other user devices) as well as to an access device on the home network. Once the access device is provisioned with the accessory device's network access token, the router can control whether the accessory device is to be granted access to the home network and for how long.

20 Claims, 12 Drawing Sheets

Related U.S. Application Data filed on May 28, 2019, provisional application No. 62/828,370, filed on Apr. 2, 2019, provisional application No. 62/828,372, filed on Apr. 2, 2019, provisional application No. 62/808,223, filed on Feb. 20, 2019, provisional application No. 62/808,227, filed on Feb. 20, 2019.

(51) Int. Cl.
*H04W 12/06* (2021.01)
*H04L 9/40* (2022.01)

(56) References Cited

U.S. PATENT DOCUMENTS

| | | | |
|---|---|---|---|
| 2014/0137206 A1* | 5/2014 | Hansmann | H04W 12/04 726/4 |
| 2014/0233545 A1* | 8/2014 | Ferguson-James | H04W 12/06 370/338 |
| 2018/0034690 A1* | 2/2018 | Sivarajan | H04W 4/50 |
| 2019/0261168 A1* | 8/2019 | Shi | H04L 63/0435 |

* cited by examiner

NETWORK ACCESS TOKENS FOR ACCESSORIES

CROSS REFERENCES TO RELATED APPLICATIONS

This application claims the benefit of U.S. Provisional Application No. 62/808,227, filed Feb. 20, 2019, and U.S. Provisional Application No. 62/828,372, filed Apr. 2, 2019, and U.S. Provisional Application No. 62/853,537, filed May 28, 2019, and U.S. Provisional Application No. 62/808,223, filed Feb. 20, 2019, and U.S. Provisional Application No. 62/828,370, filed Apr. 2, 2019, and U.S. Provisional Application No. 62/853,531 filed May 28, 2019, the disclosures of which are incorporated by reference herein in their entireties and for all purposes.

BACKGROUND

Owners of today's home Wi-Fi networks have very little control over access to their own network. Home Wi-Fi networks almost exclusively use the Wi-Fi Protected Access (WPA) security standard, which relies on a single passphrase that is shared across all clients. Once the owner shares the passphrase with a guest, the owner relinquishes control over who may access his or her network. The guest is free to share the passphrase with anyone else, potentially granting other people access to the Wi-Fi network without needing the owner's consent. Further, outside of reconfiguring the network with a new SSID/passphrase and reconfiguring all owner-owned network devices, the owner has no mechanism to ensure that a previously provided passphrase will not be used to gain future access to the network.

BRIEF SUMMARY

Embodiments of the present disclosure can provide systems, methods, and computer-readable media for providing improved security and network management.

In some embodiments, a computer-implemented method is disclosed. The method may comprise establishing, by a controller device, a first connection with a wireless access device in a home environment, the wireless access device managing a password-based network. The method may comprise provisioning, by the controller device, a WiFi password for the password-based network with the wireless access device. The method may comprise identifying, by the controller device, an accessory device that is yet to be configured for network access. The method may comprise generating, by the controller device, a dynamically generated token for the accessory device. The method may comprise providing, by the controller device, the dynamically generated token to the accessory device using a second connection and to the wireless access device using the first connection. The method may comprise configuring, by the controller device, the wireless access device to only provide the network access to the accessory device through utilization of the dynamically generated token by providing the dynamically generated token to the wireless access device.

In some embodiments, configuring the wireless access device to provide network access may configure the wireless access device to provide the network access corresponding to a second network, the second network being configured for token-based authentication.

In some embodiments, the method may comprise generating one or more dynamically generated tokens corresponding to one or more accessory devices previously granted access to the password-based network. The method may comprise providing the one or more dynamically generated tokens to the one or more accessory devices and the wireless access device. In some embodiments, providing the one or more dynamically generated tokens to the one or more accessory devices causes each of the one or more accessory devices to interact with the wireless access device utilizing a respective dynamically generated token of the one or more dynamically generated tokens to gain network access to the password-based network.

In some embodiments, the method may comprise configuring, by the controller device, the wireless access device to provision a token-based network. In some embodiments, configuring the wireless access device to manage the token-based network may comprise causing the wireless access device to enable a network setting in local memory.

In some embodiments, providing the dynamically generated token to the accessory device may cause the accessory device to transmit a message to the wireless access device to join the token-based network.

In some embodiments, the method may comprise receiving, by the controller device, user input related to generating the dynamically generated token. In some embodiments, the user input may specify expiration data associated with the dynamically generated token. The method may further comprise transmitting, by the controller device, the expiration data with the dynamically generated token to the wireless access device to cause the dynamically generated token to be revoked based at least in part on the expiration data.

In some embodiments, the method may comprise receiving, by the controller device, user input indicating a desire to revoke the dynamically generated token. The method may further comprise transmitting, by the controller device, a revocation message to the wireless access device to cause the wireless access device to revoke the network access of the accessory device corresponding to the dynamically generated token.

In some embodiments, a controller device is disclosed. The controller device may comprise one or more processors in communication with one or more memories. In some embodiments, the one or more processors may be configured to execute computer-executable instructions stored on the one or more memories to cause the controller device to perform operations. The operations may comprise configuring a wireless access device to provision a token-based network. In some embodiments, the wireless access device may be configured to manage the token-based network in addition to a previously configured password-based network. The operations may comprise detecting an accessory device that has yet to be configured to access the token-based network. The operations may comprise generating a device-specific token for the accessory device. The operations may further comprise providing the device-specific token to the accessory device and to the wireless access device. In some embodiments, the device-specific token may be provided to the wireless access device to configure the wireless access device to grant the accessory device access to the token-based network upon receipt of the device-specific token from the accessory device.

In some embodiments, the operations performed by the controller device may further comprise receiving user input indicating an invitation to the accessory device to join the token-based network. In some embodiments, providing the device-specific token may comprise transmitting an electronic message accessible by the accessory device in response to the user input. In some embodiments, the device-specific token is generated for the accessory device and transmitted in the electronic message in response to receiving the user input.

In some embodiments, the wireless access device is configured to manage a plurality of token-based networks comprising the token-based network. In some embodiments, the wireless access device is configured to provision the token-based network in response to receiving the device-specific token. In some embodiments, the wireless access device is configured to determine one or more additional accessory devices associated with the accessory device. In some embodiments, the wireless access device is configured to grant access to the token-based network only to the accessory device and the one or more additional accessory devices associated with the accessory device.

In some embodiments, a computer-readable storage medium is disclosed. The computer-readable storage medium may store computer-executable instructions that, when executed by one or more processors of a controller device, configure the one or more processors to perform operations. The operations may comprise configuring a wireless access device to provision a token-based network. The operations may further comprise generating a network access token for an accessory device to enable network access for the accessory device to the token-based network. The operations may further comprise providing the network access token to the wireless access device. In some embodiments, the wireless access device may be configured to store the network access token in local memory. The operations may further comprise providing the network access token to the accessory device. In some embodiments, the accessory device may be configured to request the network access from the wireless access device by providing the network access token. In some embodiments, the wireless access device may be further configured to grant the network access based on a comparison between the network access token as stored in local memory and the network access token provided by the accessory device.

In some embodiments, the operations performed by the controller device may further comprise receiving user input identifying an expiration time associated with the network access token. In some embodiments, the network access token may be generated in response to receiving the user input. In some embodiments, the operations performed by the controller device may further comprise transmitting the expiration time to the wireless access device, the wireless access device being configured to revoke the network access for the accessory device when the expiration time is reached.

In some embodiments, the wireless access device revokes the network access by deleting the network access token from local memory and transmitting a disassociate message to the accessory device to cause the accessory device to delete the network access token and to disconnect from the token-based network.

In some embodiments, the wireless access device is configured to ensure that only the accessory device, and no other accessory device, is granted access to the token-based network.

In some embodiments, the operations performed by the controller device may further comprise transmitting the network access token to a service provider computer configured to execute a configuration service. The operations may further comprise receiving user input indicating that the wireless access device is being replaced with a new wireless access device. The operations may further comprise transmitting, to the service provider computer, an indication that the wireless access device is being replaced with a new wireless access device. In some embodiments, the new wireless access device may be configured to provide only a password-based network. In some embodiments, the service provider computer is configured to facilitate migrating the accessory device from the token-based network to the password-based network provided by the new wireless access device.

In some embodiments, the network access token may comprise an accessory device identifier, a service set identifier corresponding to the token-based network, a token associated with the wireless access device, and expiration data associated with the network access to be provided to the accessory device.

In some embodiments, transmitting the network access token to the accessory device may cause the accessory device to generate a modified network access token utilizing the network access token and digitally signed data generated by the accessory device. In some embodiments, network access is obtained utilizing the modified network access token.

DETAILED DESCRIPTION

Figure 1:
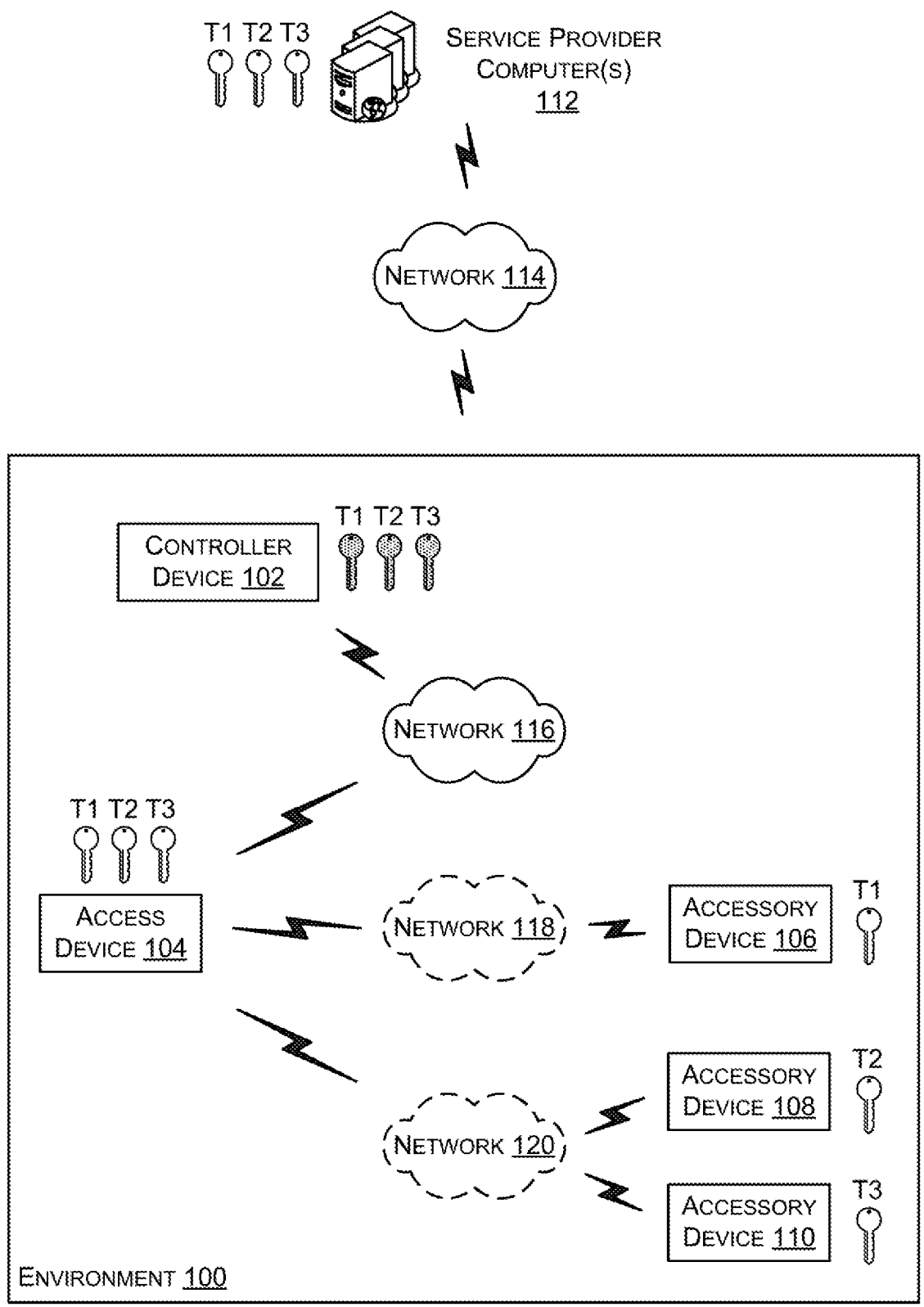
FIG. 1 depicts a block diagram of an example environment for implementing the disclosed techniques, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Conventionally, when an accessory device is powered on within or enters a wireless network area, it generally needs to acquire access to the Local Area Network (LAN) by wirelessly connecting to the router. An accessory device can include any device that is controllable by a controller device (e.g., a device associated with a network administrator) or has access to the LAN for performing one or more network-related functions. Examples of accessory devices include light fixtures, thermostats, door locks, automatic door openers (e.g., a garage door opener), still or video cameras, kitchen appliances, and so on. The router can act as an access point (AP) for communication within the LAN between devices connected to the LAN, but can also act as a connection point to the Internet (thus, providing Wide Area Network (WAN) access as well). One way of connecting an accessory device to the router is to provide the user's login information (e.g., credentials such as a WiFi password) to the accessory device. Traditionally, an accessory device can broadcast its WiFi identifier (e.g., a service set identifier (SSID) or a "fake" SSID) to a user device. This simulates a WiFi connection with the user device such that the user device can verify the identity of the accessory device and, upon verification, can send the WiFi password to the accessory device. Then, the accessory device can use that WiFi password to gain network access from the router. However, this approach requires the user to share his or her login information with other users and other user devices.

Some embodiments are directed to keeping the network password secure (e.g., known only to the network administrator), while still providing network access to an accessory device. In some embodiments, a controller device (e.g., a desktop computer, home network base station, mobile phone, laptop, tablet, or the like) within a home network can be configured to generate network access tokens for various accessory devices. Network access tokens can be used by accessory devices to access the network without needing the traditional password. Network access tokens can be device-specific, revocable, and/or for a limited time. A network access token (also referred to herein as a token) may include any suitable data such as an identifier for the token holder, a certificate generated by a token generator, a network SSID, expiration data, and the like. Generally, a token may include any suitable data with which the token holder may be identified and/or data with which the token holder may gain network access. Expiration data may include an expiration time and/or date, a time period (e.g., 5 hours, 1 day, etc.) for which the token is valid, or an indication that the token does not expire.

The controller device can generate any suitable number of network access tokens, and can provide them to corresponding accessory devices (and/or other user devices such as a guest's mobile phone) as well as an access device (e.g., a wireless router) on the network. An access device may be configured to maintain access data including the network access tokens within a container stored in local memory (e.g., in a mapping between an accessory device identifier and a network access token, in a list of network access tokens with which access is to be granted, in an object for each accessory device and related data, or the like). Utilizing this access data, the access device can control which accessory devices have access to the network and for how long. It should be appreciated that the terms "accessory device" and "accessory devices" are intended to include user devices such as desktops, laptops, tablets, wearable devices, mobile phones, or the like, that are owned by the network administrator and/or user devices owned by another user (e.g., a family member, a guest to the network, etc.). Accordingly, any example provided herein which utilizes the term "accessory device" can equally be applied to a use case in which the access concerns a "user device," and vice versa.

In some embodiments, the network access token for an accessory device can be generated by the controller device, a service provider (e.g., a cloud service or the like), the access device (e.g., a wireless router, a mesh network access point, etc.), or another network device (e.g., an accessory coordinator device, an accessory controller device, or a home hub). The network access tokens can be managed and/or stored on any of the above devices as well, but in all cases, the network access tokens will also be stored at the access device. In this way, when the accessory device is provided its own network access token (e.g., instead of the traditional WiFi password), the accessory device can log in to the access device with a network access token that is specific to that accessory device. The access device can receive a request from the accessory device that includes the device-specific network access token. The access device can consult a mapping, a list, an object or the like, that is stored in local memory to determine if the accessory device is to be granted network access. By way of example, the access device may consult a mapping and/or object that includes an association between an accessory device identifier and a particular network access token. If the access device determines the accessory device has provided the correct network access token (e.g., a network access token that matches the one associated with the accessory device), the access device may provide WAN and/or LAN access to the accessory device. If the accessory device did not provide the correct network access token, network access may be denied. In some cases, the network access token may be a pre-shared key (PSK). Since each PSK is assigned per accessory, it may, in some instances, be referred to as a "per-accessory PSK" or "PPSK."

In some examples, the accessory device can use the token or key in place of the WiFi password. Each network access token is unique for each accessory device and each network access token can be revoked or be configured with timing restrictions, etc. An administrator can utilize an application executing on the controller device to manage access for accessory devices and/or other user devices with respect to the network. User interfaces may be provided via the application to enable the user to browse for new and/or accessory devices that have not yet been configured to add them to the network. Upon receiving an indication that an accessory device is to be added to the network, the user device can generate and provide a network access token to the accessory device as well as the access device. The network access token can be stored at the user device, at the access device, and/or at a service provider (e.g., a service provider of a configuration service).

In some examples, the use of a network access token can facilitate easy replacement of a new access device (e.g., if the user's router fails in some way). For example, a new access device that is connected to the network (e.g., to a modem or other service provider hardware for accessing the Internet) can be quickly provisioned with all the respective network access tokens for every accessory/user device in the network. One option is for a web service (e.g., a cloud-based service provided by the service provider) to maintain the access data that was also stored at the original access device.

When a new access device is ready to be configured, the web service can provision the new access device with the access data (e.g., a mapping of the accessory/user device identifier to network access tokens, accessory device objects that include corresponding network access tokens, etc.) and/or the configuration service may transmit the access data to a local device on the network (e.g., a controller device) that can then provide the access data to the new router. As an additional example, any suitable access point (AP) of the network can be provisioned with the access data, such that it can facilitate LAN connection to a router for an accessory device, in the case that the router is out of range of the controller device.

In some examples, if an access device that is configured to manage network access tokens mappings fails, and the user cannot replace it with another token-enabled access device, a non-token-enabled access device may be utilized. In this case, a configuration service provided by the service provider can be provided to facilitate configuration of network access for the accessory devices via the new access device, even though the new access device does not know about the network access tokens that the accessory devices may be using to log in. In some cases, the configuration service provided by the service provider can enable translation and/or replacement of the network password with network access tokens, or network access tokens with the network password.

For example, the configuration service can communicate with the accessory device and instruct the accessory device to replace the network access tokens with a password (e.g., the original WiFi password or some other sharable (e.g., temporary) password) in preparation for switching to a non-token-enabled router. However, this configuration service may only work if the service is utilized before the routers are switched. Otherwise, the accessory devices may not be able to access the configuration service unless it is in communication with a controller device (e.g., one that has cellular or other non-router-based Internet access). In this case, the controller device could connect the accessory devices to the configuration service even after the token-enabled access device has been removed/replaced. Additionally, another option is to instruct the accessory devices to revert to a setup mode when each detects that its network access token no longer works (e.g., network access is no longer being provided). Instructing the accessory device to revert to a setup mode can cause the accessory device to broadcast its SSID again (or a temporary SSID), as would be the case in conventional systems. In this way, other devices on the network (e.g., the controller device) could identify that the accessory device is not connected and provide the WiFi password to the accessory device.

In some examples, the service provider that manages the access data may maintain knowledge of which access devices are token-enabled and which are not. As a result, the service provider can determine when the accessory devices need to be instructed to use a network access token, to use a shared password, or to roll back to the setup mode. In some cases, an accessory device and/or the access device are configured to support multiple SSIDs. By way of example, the access device can support a password-based network (e.g., a network where access is gained utilizing a password shared by all clients in the network) as well as one or more token-based networks (e.g., a network where access is gained utilizing a network access token that is unique to a particular device, and which is different from the password). Thus, instructing an accessory device to replace the network access token with a common password may also include instructing the accessory to move from a first SSID of the access device (e.g., a token-based network) to a second SSID of the access device (e.g., a password-based network).

In some examples, the service provider that manages network access tokens and the home network can also identify mesh network components (e.g., access devices such as routers and/or APs operating in a mesh network topology) that are wirelessly connected within a network. Instead of identifying each individual device of a mesh, the service provider can be configured to identify them individually and/or as a group. In some cases, the service provider may be configured to identify which access device of the group is operating as a master device, if there is a master device. Accessory manufacturers may be able to describe the topology when the devices are registered with the service provider, such that the service provider can be informed about their respective locations, priorities, priorities, etc. The techniques described herein regarding maintaining access data and enabling access to the network may be similarly applied to networks that utilize mesh network components.

As noted above, in some instances, network access tokens can be revoked. Thus, in some embodiments, devices can be provided with temporary network access tokens. This may be especially valuable for non-accessory devices (e.g., other user devices of other users that may be visiting). Network access tokens can be assigned a time limit (e.g., 5 hours, 1 day, etc.). The access device may be configured to detect when the time limit of a network access token has been reached (referred to as "expiration time"). Upon determining that the time limit has been reached, the access device can revoke network access for the accessory device corresponding to the expired network access token. Revoking network access may include deleting the network access token for the accessory device and sending a disassociated message to the accessory device to cause the accessory device to delete its token. In some embodiments, the access device may further inform the controller device that the token has expired and access has been revoked such that the controller device may delete the token associated with the accessory device (if there is one) from local memory. In some embodiments, the network access token can be deleted upon expiration from the access device, the controller device, the accessory device, or any suitable combination of the above. In some cases, the administrator may utilize interfaces at the controller device to specify a time limit (e.g., an expiration time, a period of time before expiration, etc.) for the network access token, or the time limit may be set to a default value (e.g., 2 hours, 4 hours, 1 day, etc.).

As another example of revocation, a user interface may be provided at the controller device (e.g., via an application executing on the controller device) that enables the administrator to manually revoke network access tokens corresponding to one or more accessory devices and/or user devices. Upon receiving an indication that a network access token is to be revoked for a particular device, the controller device may transmit any suitable data to the access device to cause the access device to revoke network access for the specified device. For example, the access device may delete the network access token and cause (e.g., transmit a disassociate message to cause) the token to be deleted at the accessory device as well. The controller device and/or the access device can transmit to the configuration service an indication that the particular device's network access has been revoked. Revocation processes can include deleting at least the network access token from any suitable combination of the controller device, the access device, and/or the configuration service.

In some embodiments, the access device may be configured to maintain one or more separate token-based networks that may each be associated with access corresponding to one or more accessory devices and/or user devices (e.g., one or more guest devices). This may provide greater security by ensuring that each accessory device and/or user device can be provided WAN and/or LAN access, without enabling these devices to access other devices on the network. In some embodiments, a user interface may be provided at the controller device (e.g., via an application executing at the controller device) that enables the user to specify one or more accessory devices that are to be allowed access to one another. As another example, the controller device may retrieve server data from the service provider that is associated with the accessory device to determine what other devices the accessory device is to be given access (e.g., what other accessory devices should be given access to the same LAN as the instant accessory device). Configuration information indicating what other devices with which an accessory device may communicate may be provided by an entity (e.g., a manufacturer of the accessory device) during an enrollment process conducted with the service provider (e.g., via interfaces/portals provided by the service provider. Utilizing these techniques, the access device may be configured to maintain a separate, token-based network associated with these devices such that they may be provided LAN access to one another and WAN access (e.g., Internet access), while ensuring that they may not access other devices in the network (e.g., devices associated with other LANs).

As another example, the access device may maintain the configuration data that indicates specific rules for providing access to specific types of accessory and/or user devices. By way of example, this configuration data may specify that an accessory device of type X may require data from an accessory device of type Y. If an accessory device of type Y is currently being provided access via LAN A, the accessory device X may be configured to access LAN A using its network access token. If not, a new token-based network (e.g., LAN B) may be generated by the access device, and accessory device X may be configured to access LAN B with its network access token. Subsequently, if an accessory device of type Y requests access, the access device may be configured to enable accessory device Y to access LAN B.

Utilizing the techniques described herein, remote and/or temporary network access can be granted to accessory and/or user devices (e.g., corresponding to a housekeeper, a guest, a tenant, etc.) without ever generating or sharing a network password. However, in some examples, only the owner of the password can grant access. Thus, only an owner of the password (or a controller device that is associated with an administrator of the network) may grant permission for a network access token to be generated and provided to a device. Additionally, because each network access token is generated for a particular accessory or user device, that network access token cannot be shared with any other devices. Thus, the techniques discussed herein provide improvements related to network and data security.

In some examples, the techniques described above can be implemented and/or extended to any type of password authentication and/or encryption protocol. For example, the above techniques could be used with WiFi Protected Access (WPA, WPA2, etc.) protocols, where both devices can authenticate each other, as opposed to just the router authenticating the identity of the accessories. With WPA, the accessory can also authenticate the identity of the router.

FIG. 1 depicts a block diagram of an example environment 100 for implementing the disclosed techniques, according to some embodiments. The environment 100 may include a controller device 102, access device 104, any suitable number of accessory devices (e.g., accessory devices 106-110). One or more of the devices depicted in environment 100 may be communicatively connected to service provider computer(s) 112 via network 114 (e.g., a wide area network such as the Internet).

Networks 116, 118, and 120 are intended to be examples of local area networks that are operated within environment 100. In some embodiments, access device 104 (e.g., a wireless router) may be configured to manage one or more networks such as networks 116, 118, and 120, as well as access to network 114. In some embodiments, network 116 is an example of a password-based wireless network (e.g., a wireless protected access private (WPAP) network). The access device 104 may be previously configured (or configured by the controller device 102) to enable access to network 116 and, in some cases, to network 114 based at least in part on receiving and authenticating a password provided by the requesting device.

The controller device 102 may be any suitable electronic device capable of transmitting and receiving data wirelessly using one or more suitable wireless communication protocols (e.g., WiFi, Bluetooth®, Bluetooth BLE®, etc.). For example, the controller device 102 may be a home owner's mobile phone. Although not depicted, the controller device 102 may include a configuration application with which a user may transmit and receive data associated with configuring, managing, and/or monitoring of one or more networks provided by access device 104. The access device 104 may be any suitable device, such as a wireless router, that can provision and manage a password-based network (e.g., network 116) and/or one or more token-based networks (e.g., network 118, network 120, and the like).

In some embodiments, the controller device 102 may be used to utilize a network password to request access to network 116 from the access device 104. In some embodiments, this request may be transmitted via a short-range wireless protocol (e.g., Bluetooth®, Bluetooth BLE®, etc.). When the provided password matches a stored password associated with the network 116, the access device 104 can enable access by the controller device 102 to the network 116 and/or the network 114. Although the network 116 is described as being password-based (e.g., accessed utilizing a password that is shared among all devices in the network 116), it should be appreciated that the network 116 may alternatively be a token-based network (e.g., accessed utilizing a device-specific network access token that is associated with a particular device).

In some embodiments, the accessory device 106-110 may also be any suitable electronic device that is configured to transmit and receive data via any suitable wireless communication protocol. As a non-limiting example, the accessory devices 106-110 may include thermostats, lights, mobile phones, wearable devices such as a smart watch, garage doors, kitchen-appliances, and the like. As discussed above, the accessory devices 106-110 may be examples of user devices that are operated by the administrator (e.g., a home owner) or the accessory devices 106-110 may be examples of user devices that are operated by other users (e.g., a guest of the home owner).

In some embodiments, the controller device 102 may receive data (e.g., a connection request) from each of the accessory devices 106-110 as the accessory devices are powered on and/or enter within a threshold distance of the controller device 102 (e.g., according to a threshold range associated with the wireless communications protocol being utilized). In some embodiments, the controller device 102 may be utilized to proactively provide an accessory device with a network access token (e.g., T1, T2, T3, etc.) that can be utilized to access one of the networks 116-120 as the accessory device subsequently enters within the network area. In some embodiments, this invitation may utilize network 114 (e.g., the Internet) and/or another communications network such as a cellular network, for example.

The controller device 102 may be configured to generate, request, and/or receive one or more network access tokens corresponding to any suitable number of accessory devices. In some embodiments, a unique identifier for each accessory device (e.g., a Media Access Control (MAC) address, a device serial number, an alphanumeric code, etc.) may be associated with a single network access token. In some embodiments, this association may be stored in an object, list, mapping, or any suitable container configured to store one or more attributes associated with a specific accessory device (or user device). Some of these attributes may specify a particular authentication protocol with which authentication is to occur, a token and/or certificate associated with the access device 104, a token and/or certificate associated with the accessory device, or the like. The data listed above may generally be referred to as "access data."

The network access tokens (e.g., T1, T2, and T3) generated by the controller device 102 may include any suitable combination of the access data listed above. In some embodiments, upon receiving and/or generating a network access token for a specific accessory device, the controller device 102 may transmit the network access token to the corresponding accessory device (e.g., T1 to accessory device 106, T2 to accessory device 108, and T3 to accessory device 110) as well as the access device 104 which, in turn, may store the network access tokens in local memory. As an example, upon receiving a network access token (e.g., T1), the accessory device 106 may be configured to access network 118 by providing its network access token T1 to the access device 104. The access device 104 may check that the provided network access token is the same as the one stored in local memory. In some cases, the access device 104 may further verify (e.g., using the stored data) that the network access token is associated with the accessory device 106 (and not some other device) before enabling access to the network 118.

It should be appreciated that the access device 104 may be configured to provision and manage a single token-based network or multiple token-based networks (as depicted in FIG. 1). By way of example, the access device 104 may be configured to provision and manage a separate token-based network for single accessory devices (e.g., as depicted by network 118 with respect to accessory device 106) or for multiple accessory devices (e.g., as depicted by network 120 with respect to accessory device 108 and accessory device 110) or for all accessory devices (not depicted). The access device 104 may be preconfigured with a variety of rules that govern network provisioning rules for a variety of accessory device types.

By way of example, the access device 104 may utilize predetermined network provisioning rules to determine that accessory device 108 (e.g., a thermostat) and accessory device 110 (e.g., another thermostat) may require communication with one another to provide some functionality and/or that devices of that type (e.g., thermostats, brand X thermostats, etc.) are to utilize a common network. As another example, an application executing on controller device 102 may be utilized to provide network provisioning rules (e.g., create a separate token-based network for accessory devices 108 and 110) to access device 104. The access device 104, upon receiving a network access token for accessory device 108 (e.g., from the controller device 102) may be configured to provision network 120 for accessory device 108. When accessory device 108 then provides the access device its network access token (e.g., originally received from the controller device 102), the access device 104 may authenticate the accessory device 108 using the network access token and enable access by the accessory device 108 to network 120. At a subsequent time, the access device 104 may receive a network access token for accessory device 110. Utilizing the locally stored network provisioning rules, the access device 104 may identify that accessory device 108 and/or accessory device 110 need to be able to communicate with one another in order to provide some portion of their respective functionality. Accordingly, the access device 104 may provide accessory device 110 access to network 120 upon receiving and verifying the network access token for accessory device 110.

The service provider computer(s) 112 may host a cloud-based service (referred to herein as a "configuration service"). The service provider computer(s) 112 may be communicatively connected with controller device 102 and/or access device 104. In some embodiments, the service provider computer(s) 112 may generate and/or receive network access tokens and/or any suitable portion of access data associated with a particular accessory device (or user device). In some embodiments, the service provider computer(s) 112 may be configured with one or more user interfaces which may be utilized by an entity associated with the accessory device (e.g., a manufacturer of the accessory device) to provide one or more attributes associated with the accessory device. As a non-limiting example, a manufacturer may utilize these user interfaces to provide a unique identifier (e.g., a serial number, a MAC address, etc.) for a particular accessory device. The manufacturer may further utilize the user interfaces provided by the service provider computer(s) 112 to provide network provisioning rules for the accessory device. By way of example, the manufacturer of accessory device 108 may utilize these user interfaces to indicate that accessory device 108 (or devices that share some suitable attribute as a device type) should be communicatively coupled with accessory device 110 (or devices that share some suitable attribute such as a device type). These attributes and/or rules (referred to herein as configuration data) may be stored by the service provider computer(s) 112 as an object (or another suitable container). In some embodiments, the service provider computer(s) 112 may transmit configuration data to the controller device 102 and/or access device 104 (e.g., directly, or by utilizing the controller device 102) where the configuration data may be stored for subsequent use.

In some embodiments, the controller device 102 (or the access device 104) may be configured to transmit network access tokens generated by the controller device 102 to the service provider computer(s) 112. Upon request, the service provider computer(s) 112 may transmit the network access tokens and/or configuration data to the access device 104 (e.g., directly, or by utilizing the controller device 102), or another access device (e.g., a replacement access device). Thus, should the access device 104 be replaced with a new access device, the new access device may be automatically configured to provide networks 116-120 and to enable access to accessory device 106-110 utilizing previously generated network access tokens. It should be appreciated that in some embodiments, the service provider computer(s) 112 may be configured to generate and store network access tokens for accessory devices by request. By way of example, the controller device 102 may receive data from the accessory device 106 indicative of a request by the accessory device 106 for network access. In some embodiments, the controller device 102 may transmit a request to service provider computer(s) 112 on behalf of the accessory device 106. The service provider computer(s) 112 may then generate a network access token, store the token in an object generated and/or associated with the accessory device 106, and transmit the network access token and/or the object back to the controller device 102. The controller device 102 may then transmit the object and/or network access token to the access device 104 and/or the accessory device 106. In some embodiments, the functionality described above in connection with the service provider computer(s) 112 may be provided by the configuration service hosted by the service provider computer(s) 112.

Moving on to FIGS. 2-9, which illustrate a number of exemplary processes. It should be appreciated that the messages exchanged between any suitable combination of the devices illustrated in each figure may conform to any suitable communications protocol and/or format. As a non-limiting example, some, or all of the messages depicted in FIGS. 2-9 may conform to a previously defined HomeKit Accessory Protocol© (HAP).

Figure 2:
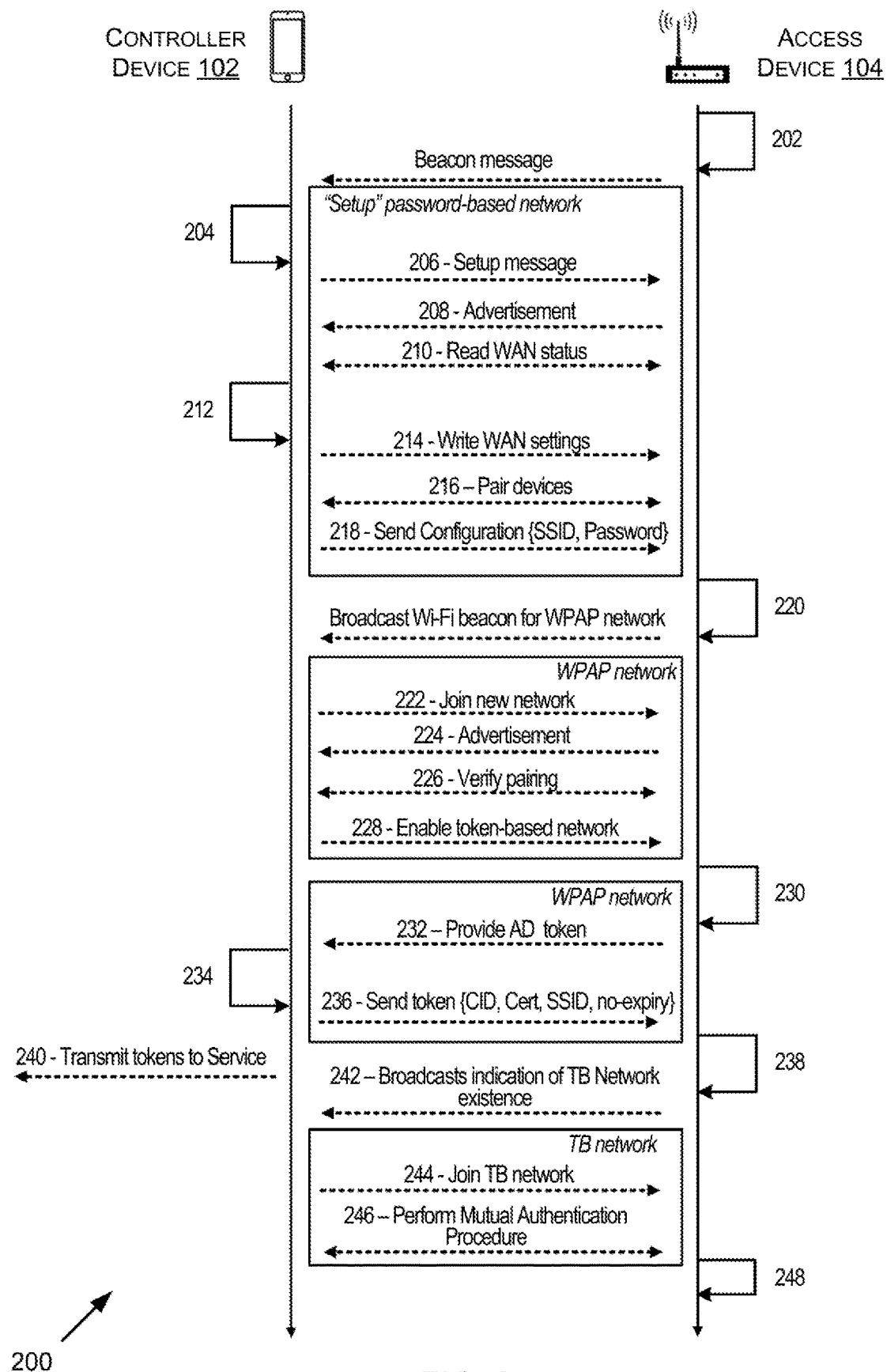
FIG. 2 is a flow diagram illustrating an exemplary process for configuring an access device, according to some embodiments.

FIG. 2 is a flow diagram illustrating an exemplary process 200 for configuring an access device, according to some embodiments. The process 200 may be performed by a controller device (e.g., the controller device 102, depicted as a mobile phone of a network administrator/owner of environment 100 of FIG. 1) and an access device (e.g., the access device 104, a wireless router).

The access device 104 may be new or otherwise not currently configured. The process 200 may begin at 202, where the access device 104 may be powered on. Once powered on, the access device 104 may be configured to transmit a wireless signal (e.g., a broadcasted Wi-Fi beacon indicating that a network may be setup and/or indicating that the access device 104 is not currently configured to manage a network.

At 204, a user interface provided by the controller device 102 (e.g., via an application executing on the controller device 102) may be utilized to initiate a setup process with the access device 104. In some embodiments, the user interface may be utilized to scan a QR code associated with the access device 104 to initiate a setup process with the access device 104. As another example, the controller device 102 may initiate a setup process upon receiving the beacon (or any suitable communication) provided by the access device 104 at 202. As part of the setup process, a user interface provided by the controller device 102 may be utilized to elicit user input such as a network name (e.g., an SSID) and a network password (also referred to as a WiFi password). The user input may be transmitted by the controller device 102 to the access device 104 at 206.

At 208, in response to receiving the setup message, the access device 104 may be configured to transmit an advertisement message requesting that the setup process uses a particular communications protocol (e.g., HomeKit Accessory Protocol© (HAP)).

At 210, upon receipt of the advertisement message provided by the access device 104 at 208, the controller device may transmit to the access device a status message to acquire WAN status data from the access device 104. In some embodiments, upon receipt of the WAN status data, the controller device 102 may identify that such data indicates that an Ethernet cable of the access device 104 is unplugged. In this case, the controller device 102 may be configured to provide a notification at the display of the controller device 102 (e.g., via a user interface rendered by the application) that indicates the condition to the user and advises the user to connect an Ethernet cable to the access device 104. If the WAN status data indicates that the access device 104 has not acquired an IP address via a Dynamic Host Configuration Protocol (DHCP), the controller device 102 may be configured to prompt the user to configure the WAN manually. In some embodiments, the controller device 102 may check the WAN status data to determine whether the access device 104 is capable of supporting a token-based network.

At 212, the controller device 102 may add the access device 104 to a locally stored database of accessory devices.

At 214, the controller device 102 may transmit a message (e.g., a HAP write message) to set particular WAN settings at the access device 104. Receipt of the message by the access device 104 may cause the access device 104 to enable a configuration parameter that configures the access device 104 to provide password-based networks.

At 216, the controller device 102 and access device 104 may execute a pairing procedure. By way of example, one or more messages corresponding to a pair-setup and/or pair-verify procedure of the HAP may be exchanged between the devices in order to communicatively pair the devices. A pair-setup procedure may require that the user enter a password associated with the access device 104 (such that bi-directional authentication may occur). A pair-verify procedure may result in a mutually authenticated shared secret that may be utilized by the controller device 102 and the access device 104 for future communications.

At 218, once paired with the access device 104, the controller device may be configured to transmit a configuration message including the SSID and password provided via user input at 204.

At 220, the access device 104 may be configured to generate a WPA private network (WPAP network) using the SSID and password provided by the controller device 102. The access device 104 may then broadcast a Wi-Fi beacon informing the controller device 102 of the existence of the WPAP network.

At 222, the controller device 102 may transmit a request to join the WPAP network and, at 224, the access device 104 may respond with another advertisement requesting the use of a particular communications protocol (e.g., HAP).

At 226, the controller device 102 and the access device 104 may verify the pairing between them. In some embodiments, this may include exchanging one or more messages associated with a pair-verify HAP procedure.

At 228, the controller device 102 may transmit a message to the access device 104 to enable a token-based network. In some embodiments, receipt of this message by the access device 104 may cause a parameter corresponding to managing a token-based network to be enabled at the access device 104. The access device 104 may receive this message and, if it is capable of managing a token-based network, the flow may proceed to 230. If the access device 104 is not capable of managing a token-based network, the flow may end at 228.

At 230, the access device 104 may generate a token for itself. By way of example, the access device 104 may generate a public (cryptographic) key and corresponding private (cryptographic) key. The access device 104 may digitally sign its public key with its private key. The digitally signed data may be referred to as the access device's "token." The access device 104 may provision a token-based network for subsequent use.

At 232, the access device 104 may transmit its token (e.g., its digitally signed public key) to the controller device 102. In some embodiments, the transmission may utilize a HAP write message. The message and/or token may further include network data associated with the token-based network provisioned by the access device 104. By way of example, the additional data can include an SSID for the token-based network or any suitable data needed for authentication according to an Extensible Authentication Protocol Transport Layer Security (EAP-TLS) standard.

At 234, upon receipt of the access device's token, the controller device 102 may be configured to generate a token for itself. By way of example, the controller device 102 may generate a public (cryptographic) key and corresponding private (cryptographic) key. The controller device 102 may digitally sign its public key with its private key. The digitally signed data may be referred to as the controller device's "certificate." In some embodiments, the controller device 102 may alternatively request a token from the service provider computer(s) 112 of FIG. 1. In those cases, the service provider computer(s) 112 may generate a public/private key pair on behalf of the controller device 102, store the keys, digitally sign the keys using its own private key, and send them to the controller device 102 for subsequent use. The controller device 102 may then extract its public/private keys using the (already known) public key of the service provider. The controller device 102 may store the token provided by the access device 104 at 232 (e.g., the SSID of the token-based network, the access device's certificate, etc.). The controller device 102 may further store the public/private keys generated at 232. The controller device 102 may then generate a token using an identifier for the controller device 102, the SSID received at 232, and the controller device's public key as digitally signed by its private key. In some embodiments, the token may include expiration data indicating an expiration time and/or date, a period of time for which the token is valid, or an indication that the token does not expire.

At 236, the controller device 102 may transmit its token to access device 104.

At 238, the access device 104 may be configured to add the token (e.g., the controller device ID, the public key of the controller device 102 as digitally signed by its private key, the expiration data, etc.) to an access database stored and maintained by the access device 104 and associated with the token-based network's SSID. The access database may be subsequently utilized by the access device 104 to make determinations as to whether a device is to be allowed access to a network (e.g., the token-based network). In some embodiments, the access device 104 may be configured to store and maintain multiple access databases corresponding to multiple token-based networks that are managed by the access device 104 or the access device 104 may store tokens corresponding to multiple token-based networks in a single access database.

At 240, the controller device 102 may transmit a message to the service provider computer(s) 112 of FIG. 1 (e.g., a configuration service hosted by the service provider computer(s) 112) that includes the token for the controller device 102 and the token associated with the access device 104. The service provider computer(s) 112 may be configured to store such information for later use.

At 242, the access device 104 may broadcast a Wi-Fi beacon on the WPAP network that indicates the existence of a particular token-based (TB) network.

At 244, the controller device 102 may transmit to the access device 104 a request to join the token-based network.

At 246, the controller device 102 and the access device 104 may exchange any suitable data associated with EAP-TLS authentication process. The access device 104 may authenticate the controller device 102 against the token stored in the access database corresponding to the TB network. The controller device 102 may similarly authenticate the access device 104 against the token stored in its local memory and received at 232. If the controller device 102 is authenticated, the access device 104 may grant the controller device 102 access to the token-based network at 248.

It should be appreciated that, although not depicted, the controller device 102 may perform any suitable process for registering the access device 104 with the configuration service hosted by the service provider computer(s) 112. By way of example, the controller device 102 may perform this registration process as part of step 244 described above. As part of this process, the controller device 102 may obtain WAN and/or LAN information (e.g., access data/tokens corresponding to one or more LANS, including one or more TB networks). Once registered, the controller device 102 may provide obtained information to the configuration service for storage. Thus, if the access device 104 is ever determined to have failed, the access device 104 (or a replacement access device) may be updated with the last WAN and/or LAN information such that the access device 104 (or the replacement access device) may subsequently provide access of various accessory devices to the appropriate token-based networks.

Figure 3:
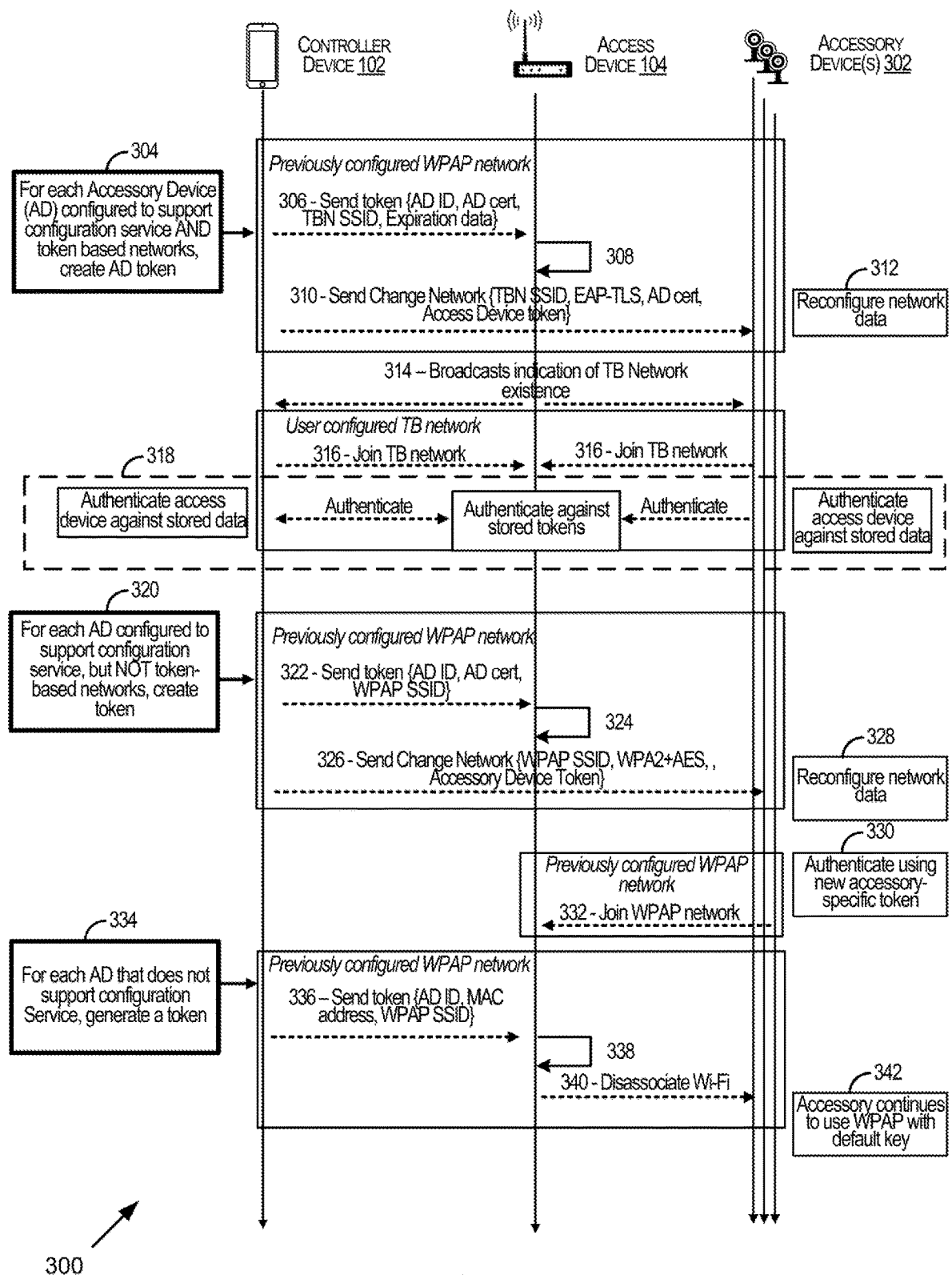
FIG. 3 is a flow diagram illustrating an exemplary process for migrating network access corresponding to a number of accessory devices, according to some embodiments.

FIG. 3 is a flow diagram illustrating an exemplary process 300 for migrating network access corresponding to a number of accessory devices (e.g., accessory device(s) 302), according to some embodiments. Each of the accessory device(s) 302 are intended to be examples of the accessory devices 106-110 of FIG. 1. It is assumed that access device 104 was previously configured to manage a WPAP network (password-based network) and at least one token-based network (TB network). It should be appreciated that the messages discussed in connection with FIG. 3 may be formatted according to a particular protocol (e.g., HomeKit Accessory Protocol© (HAP)).

The process may begin at 304, where the controller device 102 may generate a token for each accessory device that is configured to support the configuration service hosted by the service provider computer(s) 112 of FIG. 1, as well as token-based networks. The controller device 102 may generate a public (cryptographic) key and corresponding private (cryptographic) key pair for each of the accessory device(s) 302. The controller device 102 may digitally sign each public/private key pair with its own private key (this digitally signed data herein referred to as a certificate). In some embodiments, the controller device 102 may alternatively request a certificate and/or token from the service provider computer(s) 112 of FIG. 1 on behalf of each of the accessory device(s) 302. In those cases, the service provider computer(s) 112 may generate public/private key pairs on behalf of the accessory device(s) 302, store the keys, digitally sign the data with its own private key, and send the digitally signed data to the controller device 102 for subsequent use. The controller device 102 may utilize the data provided by the service provider computer(s) to generate its own certificate and/or token for the accessory device as described above. Once generated, tokens may be added to a database of accessory devices stored in local memory at the controller device 102.

At 306, via a previously configured WPAP network, the controller device 102 may transmit to the access device 104, each accessory device's token. Each token may include an identifier for the accessory device, the certificate generated by the controller device 102 (or the service provider computer(s) 112) for that accessory device, the TB network's SSID, and expiration data corresponding to the token. The expiration data may indicate one or more expiration conditions that, when met, cause access to the network obtained with the token to be revoked. In some embodiments, the token will be deleted (e.g., from the access device 104, the controller device 102, and/or the accessory device(s) 302) when it is determined that the one or more expiration conditions have been met (e.g., the token was good for 5 hours and it is now 5 hours from when the token was generated/provided).

At 308, the access device 104 may store each token in an access database (e.g., a single access database or an access database that is specific to the token-based network).

At 310, the controller device 102 may send network data such as the TB network SSID, an authentication protocol to be utilized (e.g., EAP-TLS), the accessory device certificate as generated by the controller device 102 (e.g., the public/private key pair as signed by the private key of the controller device 102), and the token (e.g., the certificate) of the access device 104 (e.g., the public key of the access device 104 as signed by the private key of the access device 104). In some embodiments, the accessory device certificate may instead be requested by the controller device 102 and generated by the service provider computer(s) 112 of FIG. 1. In these scenarios, the accessory device certificate provided by the controller device 102 may be the one generated originally by the service provider computer(s) 112.

At 312, each of the accessory device(s) 304 that are configured to support the configuration service and token-based networks may store the network data in local memory.

At 314, the access device 104 may broadcast the existence of the token-based network. In response, the controller device 102 and the accessory device(s) 302 of the ongoing use case may respond with messages requesting to join the TB network at 316.

At 318, the controller device 102, the access device 104, and the accessory device(s) 302 may exchange any suitable information according to any suitable authentication protocol (e.g., EAP-TLS) to authenticate one another. By way of example, the controller device 102 may receive the access device's token and authenticate the access device 104 against stored data (e.g., the certificate of the access device 104 received from the access device 104 during process 200 of FIG. 2). The accessory device(s) 302 may authenticate the access device 104 against the certificate associated with the access device 104 and provided by the controller device 102 at 310. The access device 104 may authenticate tokens (or certificates) provided by the controller device 102 and the accessory device(s) 302 during the authentication process, against tokens (or certificates) stored in the access database maintained by the access device 104.

At 320, for each of the accessory device(s) 302 that are configured to support the configuration service, but not a token-based network, the controller device 102 may be configured to generate a token. In this use case, the token may include an accessory device identifier that is unique to the accessory device, an accessory device certificate (e.g., the accessory device identifier as digitally signed by the controller device 102 using its private key), and the SSID for the WPAP network. Once generated, tokens may be added to a database of accessory devices stored in local memory at the controller device 102.

At 322, the controller device 102 may send each accessory device token to the access device 104. At 324, the access device 104 may store each token in the access database (or an access database corresponding the WPAP network).

At 326, the controller device 102 may send network data such as the accessory device identifier, the WPAP SSID, and an authentication protocol to be utilized (e.g., WPA2+AES, indicating a WPA2 authentication protocol using AES encryption). In some embodiments, the accessory device token may be requested by the controller device 102 and generated by the service provider computer(s) 112 of FIG. 1. In these scenarios, the token provided by the controller device 102 (or some portion of the token) may have been originally generated by the service provider computer(s) 112.

At 328, each of the accessory device(s) 304 that are configured to support the configuration service, but not token-based networks, may store the network data provided at 326 in local memory.

At 330, the accessory device(s) 304 that are configured to support the configuration service, but not token-based networks, may utilize the newly obtained accessory-specific token to reconnect to the WPAP network. In some embodiments, this is accomplished by the accessory device through transmitting its token to the access device 104 in a message requesting to join the WPAP network as depicted at 332. The access device 104 may be configured to authenticate the received token against the stored token originally provided at 322.

At 334, for each accessory device that does not support the configuration service, the controller device 102 may generate a token. In these use cases, the token may include an identifier for the accessory device, the MAC address of the accessory device, and the WPAP SSID. Once generated, tokens may be added to a database of accessory devices stored in local memory at the controller device 102.

At 336, the controller device 102 may transmit each token to the access device 104.

At 338, the access device 104 may add each MAC address (corresponding to each accessory device that does not support the configuration service) to the access database for the WPAP network.

At 340, the access device 104 may transmit a message to instruct each accessory device in the ongoing example to disassociate with the WPAP network. The disassociation message may include a default key. The accessory device(s) 304 may then be configured to access the WPAP network using the default key at 342.

Figure 4:
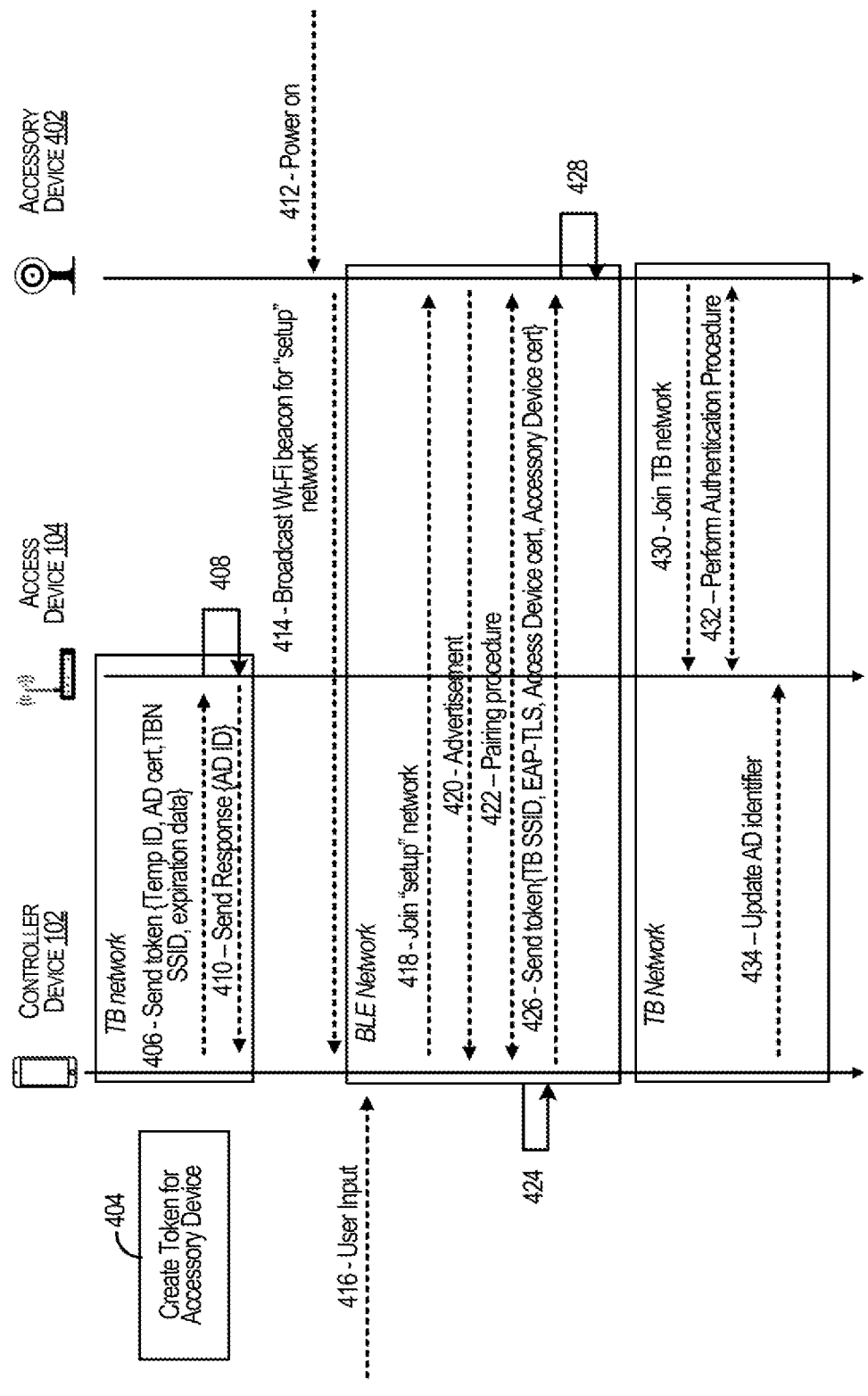
FIG. 4 is a flow diagram illustrating an exemplary process for providing network access to a new accessory device, according to some embodiments.

FIG. 4 is a flow diagram illustrating an exemplary process 400 for providing network access to a new accessory device (e.g., accessory device 402, an example of the accessory devices 106-110 of FIG. 1), according to some embodiments. A "new" accessory device is intended to refer to an accessory device that has not connected previously to any network provided by the access device 104.

At 404, the controller device 102 may be configured to generate a token for accessory device 402. By way of example, the controller device 102 may generate a public (cryptographic) key and corresponding private (cryptographic) keys for the accessory device 402. The controller device 102 may digitally sign the public/private key with its own private key (referred to as the accessory device's certificate). In some embodiments, the controller device 102 may alternatively request a token (or some portion of the token) from the service provider computer(s) 112 of FIG. 1. In those cases, the service provider computer(s) 112 may generate a public/private key pair for the accessory device 402, store the keys, digitally sign the keys using its own private key, and send them to the controller device 102 for subsequent use. The controller device 102 may extract the public/private keys using the public key of the service provider. The controller device 102 may store the public/private keys generated for accessory device 402. The controller device 102 may then generate a token from a temporary identifier generated by the controller device 102, the accessory device's certificate (as signed by the controller device 102 or the service provider computer(s) 112), and the SSID of the token-based network. In some embodiments, the token may include expiration data indicating an expiration time and/or date, a time period for which the token is valid, or an indication that the token does not expire. Thus, the expiration data may indicate one or more expiration conditions that, when met, cause access to the network obtained with the token to be revoked. In some embodiments, the token will be deleted (e.g., from the access device 104, the controller device 102, and/or the accessory device(s) 302) when it is determined that the one or more expiration conditions have been met (e.g., the token was good for 5 hours and it is now 5 hours from when the token was generated/provided, the token was good until Jan. 1, 2020, at 10:00 AM and it is now 10:00 AM on Jan. 1, 2020). Although depicted as being generated prior to receiving the broadcast at 414, it should be appreciated that the token may be created for the accessory device at any suitable time (e.g., in response to receiving the broadcast WiFi beacon at 414).

At 406, the controller device 102 may transmit the token to access device 104.

At 408, the access device 104 may be configured to add the token to an access database stored and maintained by the access device 104 and associated with the token-based network's SSID. The access database may be subsequently utilized by the access device 104 to make determinations as to whether an accessory device is to be allowed access to a network (e.g., the token-based network). In some embodiments, the access device 104 may be configured to store and maintain multiple access databases corresponding to multiple token-based networks that are managed by the access device 104 or the access device 104 may store tokens corresponding to multiple token-based networks in a single access database. Upon receipt of the token, the access device 104 may generate an identifier for the accessory device 402.

At 410, the access device 104 may be configured to send a response to the controller device 102 with the generated identifier for the accessory device.

At 412, the accessory device 402 may be powered on. At 414, the accessory device 402, may begin broadcasting a WiFi beacon that indicates it has not yet been configured and/or available for configuration. The beacon may be considered a request to configure/setup the device's network connection.

At 416, utilizing interfaces rendered by the controller device 102, a user may be prompted to enter user input related to setting up the network connection for accessory device 402. In some embodiments, the controller device 102 may be utilized to scan a QR code associated with the accessory device 402 (and provided on the accessory device or within the packaging of accessory device 402) to begin the setup process.

At 418, the user input may be transmitted by the controller device 102 to the accessory device 402 at 206 and/or the controller device 102 may be configured to transmit a join network request to the accessory device 402 to request that the accessory device join a network designated as a "setup" network.

At 420, in response to receiving the setup message, the accessory device 402 may be configured to transmit an advertisement message requesting that the setup process uses a particular communications protocol (e.g., HomeKit Accessory Protocol© (HAP)). The message may include the name of the accessory device 402 or some other unique identifier provided by the accessory device 402. In some cases, this data may be additionally or alternatively obtained during the pairing procedure performed at 422 discussed below, or at any suitable point within the process 400.

At 422, the controller device 102 and accessory device 402 may execute a pairing procedure. By way of example, one or more messages corresponding to a pair-setup and/or pair-verify procedure of the HAP may be exchanged between the devices in order to communicatively pair the devices. A pair-setup procedure may require the user to enter a password associated with the accessory device 402 (so that the bi-directional authentication may occur). A pair-verify procedure may result in a mutually authenticated shared secret that may be utilized by the controller device 102 and the accessory device 402 for future communications.

At 424, the controller device 102 may add the access device 104 to a locally store database of accessory devices.

At 426, the controller device 102 may send network data such as the TB network SSID, an authentication protocol to be utilized (e.g., EAP-TLS), the accessory device certificate as generated by the controller device 102 (e.g., the public/private key pair as signed by the private key of the controller device 102), and the token of the access device 104 (e.g., the certificate/the public key of the access device 104 as signed by the private key of the access device 104). In some embodiments, the accessory device certificate may instead be requested by the controller device 102 and generated by the service provider computer(s) 112 of FIG. 1. In these scenarios, the accessory device certificate provided by the controller device 102 at 426 may be the one generated originally by the service provider computer(s) 112. Once generated, tokens may be added to a database of accessory devices store in local memory at the controller device 102.

At 428, the network data may be stored at the accessory device 402.

At 430, the accessory device 402 may transmit a request to join the TB network to the access device 104. The request may include the token (or at least some portion of the token such as the TB SSID and the AD cert).

At 432, the access device 104 and the accessory device 402 may exchange any suitable information according to any suitable authentication protocol (e.g., EAP-TLS) to authenticate one another. By way of example, the access device 104 may receive the accessory device's token (or at least a portion of the token, such as the TB SSID and the AD cert) and authenticate the access device 104 against stored data (e.g., the token provided at 406). The accessory device 402 may authenticate the access device 104 against the certificate associated with the access device 104 and provided by the controller device 102 at 426.

At 434, at any suitable time after receiving the accessory device's identifier, the controller device 102 may transmit the accessory device identifier to the access device 104 to update the identifier associated with the accessory device 402 from the temporary identifier assigned by the controller device 102 to the identifier provided by the accessory device 402 at 420.

Figure 5:
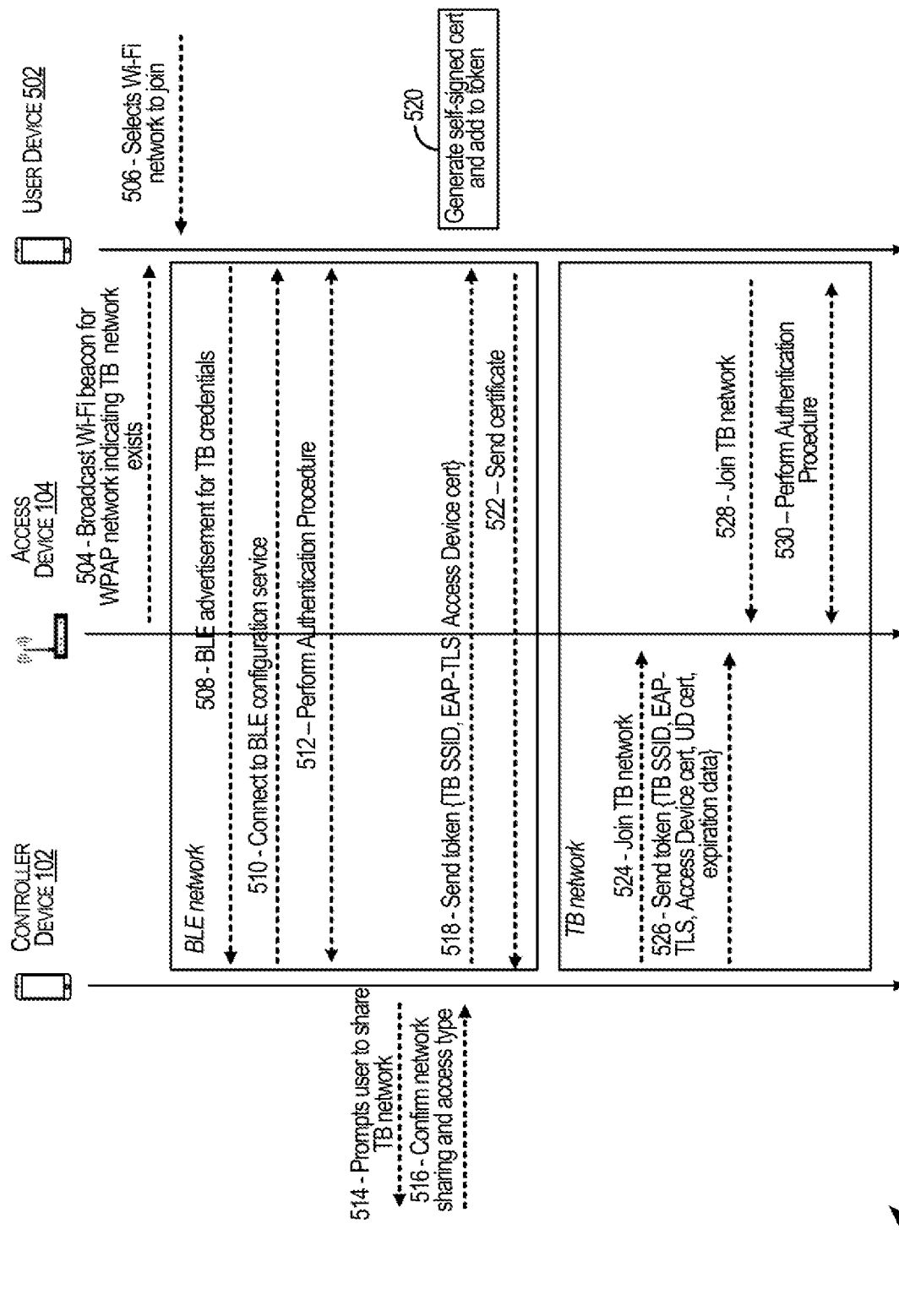
FIG. 5 is a flow diagram illustrating an exemplary process for utilizing a controller device to enable network access for a guest device, according to some embodiments.

FIG. 5 is a flow diagram illustrating an exemplary process 500 for utilizing a controller device to enable network access for a guest device (e.g., user device 502), according to some embodiments. The user device 502 may be a mobile phone of a guest that is visiting the home of the user of the controller device 102. In some embodiments, the user of the controller device 102, in this, and all the examples discussed throughout the specification, is a user that has administrative privileges with respect to network management.

At 504, the access device 104 may broadcast a Wi-Fi beacon for the WPAP network that indicates the existence of a TB network.

At 506, the user of user device 502 may be prompted (e.g., via an interface and/or application executing on the user device 502) to select a network to join. The user may select the TB network and the user input may be received by the user device 502.

At 508, the user device 502 may broadcast a Wi-Fi beacon for the TB network credentials which may be received by the controller device 102.

At 510, the controller device 102 may transmit a BLE message indicating that the user device 502 is connected to a network configuration service.

At 512, the controller device 102 and the user device 502 may exchange any suitable information according to any suitable authentication protocol (e.g., EAP-TLS) to authenticate one another. Performing the authentication procedure may result in a mutually authenticated shared secret that may be utilized by the controller device 102 and the user device 502 for future communications. As part of performing the authentication procedure, the controller device 102 and the user device 502 may be paired.

At 514, the user of the controller device 102 may be prompted to share the TB network with the user device 502. This prompt may utilize any suitable interface provided by the controller device 102 and/or an application executing on the controller device 102.

At 516, the controller device 102 may receive indication that its user has confirmed to share the TB network as well as the access type (e.g., "guest access", "long-term access," "day access," etc.) associated with the access for user device 502. In some embodiments, the access type may dictate expiration data to be associated with a token to be generated for the user device 502. In response to receiving the data at 514, the controller device 102 may be configured to generate a token. This token may contain network data such as the TB network SSID, an authentication protocol to be utilized (e.g., EAP-TLS), and the token (e.g., the certificate) of the access device 104 (e.g., the public key of the access device 104 as signed by the private key of the access device 104 as received during process). The expiration data may include one or more expiration conditions that, when met, causes access to the network obtained with the token will to be revoked. In some embodiments, the token will be deleted (e.g., from the access device 104, the controller device 102, and/or the accessory device(s) 302) when it is determined that the one or more expiration conditions have been met (e.g., the token was good for 24 hours according to an access type of "guest access," and it is now 24 hours from when the token was generated/provided).

At 518, the controller device 102 may transmit the token to user device 502.

At 520, the user device 502 may be configured to generate a self-signed certificate. By way of example, the user device 502 may generate a public and private key pair and generate a certificate by signing its public key with its private key. The user device 502 may add its certificate to the network data received at 518 to form a token. This data/token may be stored locally at the user device 502.

At 522, the user device 502 may transmit its certificate to the controller device 102.

At 524, the controller device 102 may join the TB network.

At 526, the controller device 102 may transmit the token (including the certificate signed by the user device 502) to access device 104. Upon receipt, the access device 104 may be configured to add the token (e.g., user device (UD) certificate which is the public key of the user device 502 as digitally signed by its private key, the TB network's SSID, an authentication protocol to utilize (e.g., EAP-TLS), the access device certificate, and the expiration data received at 516, etc.) to an access database stored and maintained by the access device 104 and associated with the TB SSID.

At 528, the user device 502 may request to join the TB network, the request may include the token for user device 502.

At 530, an authentication procedure may be performed by the access device 104 and the user device 502. This authentication procedure may be in accordance with the authentication protocol provided at 526. In some embodiments, the access device 104 may authenticate the user device 502 utilizing the token provided by the user device 502 during the authentication procedure against the store token associated with the user device 502 from the access database maintained by the access device 104. The user device 502 may be configured to receive the token (e.g., certificate) of the access device 104 and authenticate the access device 104 by comparing the received token to the token provided and stored at 518. If both devices authenticate one another, the user device 502 may be granted access to the token-based network.

Figure 6:
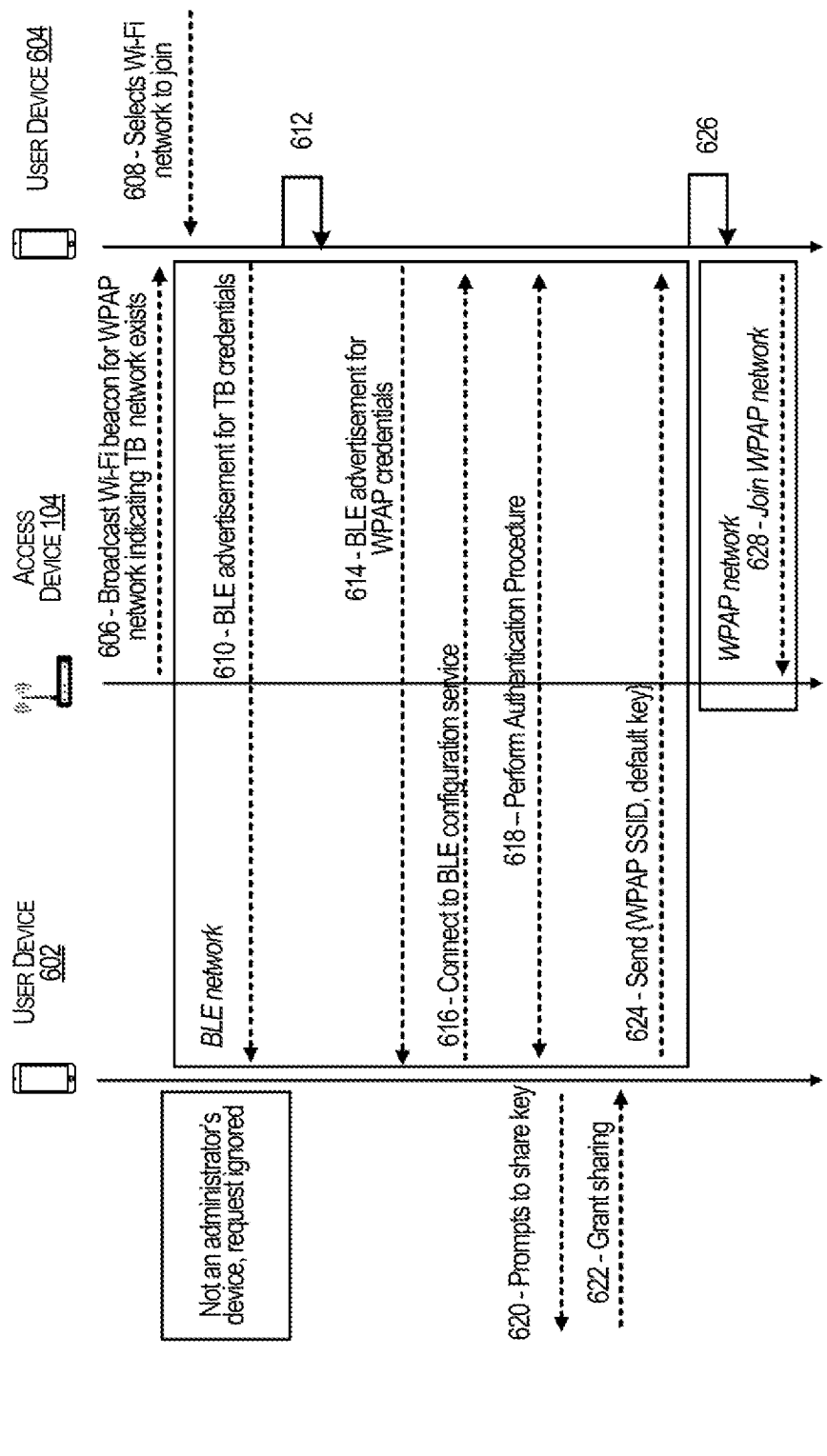
FIG. 6 is a flow diagram illustrating an exemplary process for utilizing a user device connected with the network to enable network access for a guest device, according to some embodiments.

FIG. 6 is a flow diagram illustrating an exemplary process 600 for utilizing a user device (e.g., user device 602) connected with the network to enable network access for a guest device (e.g., user device 604), according to some embodiments. The user device 604 may be a mobile phone of a guest that is visiting a friend's home. The user device 602 may also be a mobile phone of a user that is also located in the friend's home and that already has been provided the default key for the network according to the process 300 of FIG. 3. In some embodiments, the user of the user device 602 does not have administrative privileges with respect to network management within the home.

At 606, the access device 104 may broadcast a Wi-Fi beacon for the WPAP network that indicates the existence of a TB network.

At 608, the user of user device 604 may be prompted (e.g., via an interface and/or application executing on the user device 604) to select a network to join. The user may select the TB network and the user input may be received by the user device 604.

At 610, the user device 604 may broadcast a Wi-Fi beacon for the TB network credentials which may be received by the user device 602. The user device 604 does not have administrative privileges for the TB network. Accordingly, the request for TB network credentials received at 610 may be ignored.

At 612, a timer associated with the request at 610 may expire (e.g., exceed a threshold time period). In response the user device 604 may proceed to 614.

At 614, the user device 604 may broadcast a Wi-Fi beacon to request WPAP credentials.

At 616, the user device 602 may transmit a BLE message indicating that the user device 604 is connected to a network configuration service.

At 618, the user device 602 and the user device 604 may exchange any suitable information according to any suitable authentication protocol (e.g., EAP-TLS) to authenticate one another. Performing the authentication procedure may result in a mutually authenticated shared secret that may be utilized by the user device 602 and the user device 604 for future communications with one another. As part of performing the authentication procedure, the user device 602 and the user device 604 may be paired.

At 620, the user of the user device 602 may be prompted to share the WPAP network default key (e.g., the default key generated at 334 of process 300 of FIG. 3) with the user device 604. This prompt may utilize any suitable interface provided by the user device 602 and/or an application executing on the user device 602.

At 622, the user device 602 may receive indication that its user has confirmed to share the WPAP network default key. In response to receiving the data at 622, the user device 602 may be configured to generate a token. This token may contain network data such as the WPAP SSID, and the default key (e.g., the default key generated at 334 of process 300 of FIG. 3).

At 624, the user device 602 may transmit the token to user device 604. The user device 604 may store the token in local memory at 626.

At 628, the user device 602 may request to join the WPAP network, the request may include the token received at 624. If the default key provided at 628 matches the default key associated with the WPAP SSID in the access database maintained and stored at the access device 104, then the user device 604 may be granted access to the WPAP network.

Figure 7:
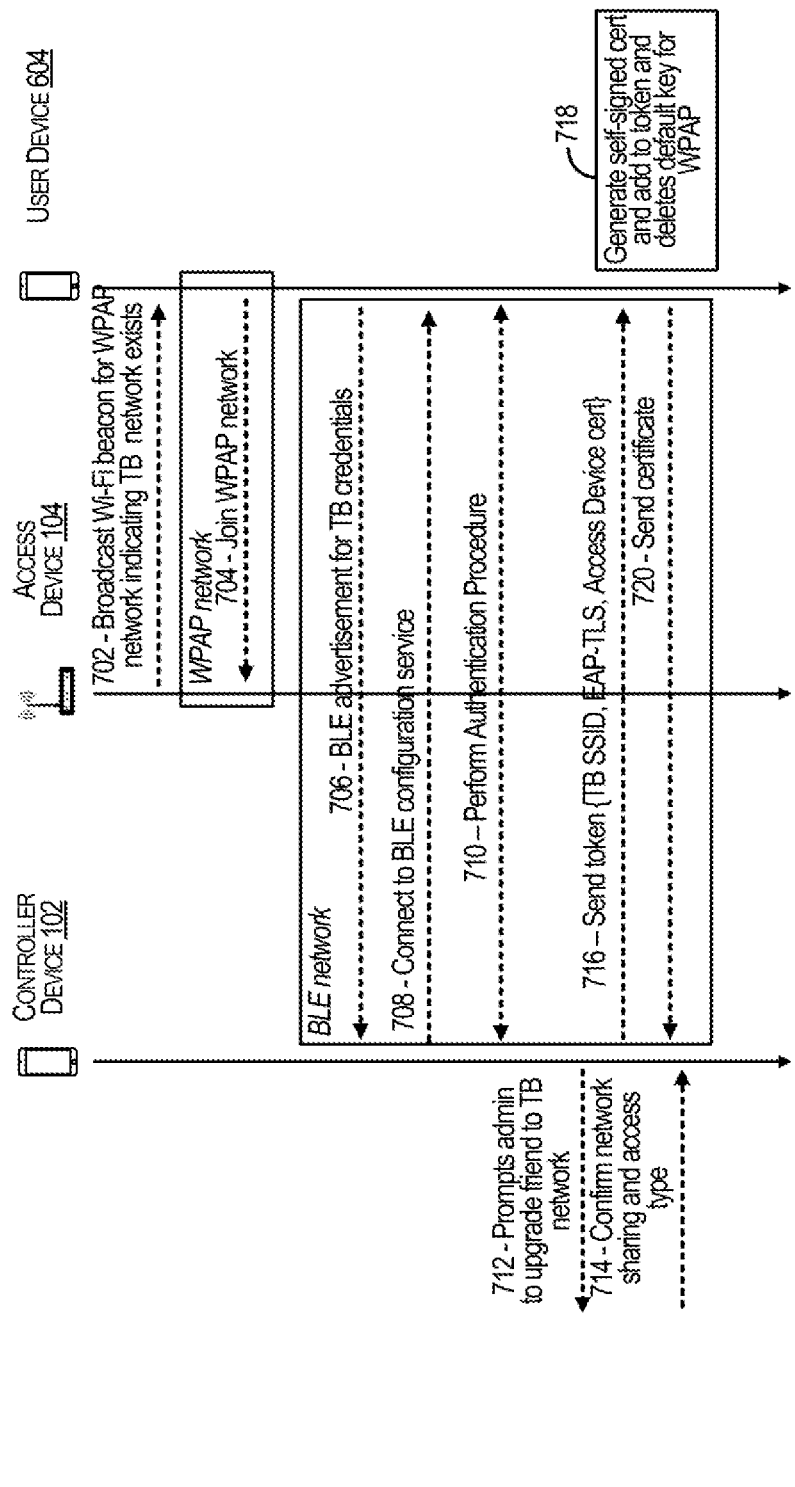
FIG. 7 is a flow diagram illustrating an exemplary process for providing network access to a guest device for which a network access token was previously provided, according to some embodiments.

FIG. 7 is a flow diagram illustrating an exemplary process 700 for providing network access to a guest device for which a network access token was previously provided, according to some embodiments. As described in FIG. 6, the user device 604 may be a mobile phone of a guest that is visiting a friend's home. The controller device 102 may be a device associated with a user that has administrative privileges with respect to network management within the home.

At 702, the access device 104 may broadcast a Wi-Fi beacon for the WPAP network that indicates the existence of a TB network.

At 704, the user device 604 may send a request to join the WPAP network due to determining that it already stores a default key associated with the WPAP SSID. The request to join the WPAP network may include the default key originally received via the process 600 of FIG. 6.

At 706, the user device 604 may broadcast a Wi-Fi beacon for the TB network credentials which may be received by the controller device 102.

At 708, the controller device 102 may transmit a BLE message indicating that the user device 604 is connected to a network configuration service.

At 710, the controller device 102 and the user device 604 may exchange any suitable information according to any suitable authentication protocol (e.g., EAP-TLS) to authenticate one another. Performing the authentication procedure may result in a mutually authenticated shared secret that may be utilized by the controller device 102 and the user device 604 for future communications. As part of performing the authentication procedure, the controller device 102 and the user device 604 may be paired.

At 712, the user of controller device 102 may be prompted (e.g., via an interface and/or application executing on the controller device 102) to upgrade the user of the user device 604 to share the TB network. The user may select the TB network and the user input may be received by the controller device 102.

At 714, the controller device 102 may receive indication that its user has confirmed to share the TB network with the user device 604 as well as the access type associated with the access for the user device 604. In some embodiments, the access type may specify expiration data to be associated with a token to be generated for the user device 604. In response to receiving the data at 714, the controller device 102 may be configured to generate a token. This token may contain network data such as the TB network's SSID, an authentication protocol to be utilized (e.g., EAP-TLS), and the token (e.g., the certificate) of the access device 104 (e.g., the public key of the access device 104 as signed by the private key of the access device 104 as received during process).

At 716, the controller device 102 may transmit the token to user device 604.

At 718, the user device 604 may be configured to generate a self-signed certificate. By way of example, the user device 604 may generate a public and private key pair and generate a certificate by signing its public key with its private key. The user device 604 may add its certificate to the token received at 720. The token may be stored locally at the user device 604 and the default key for the WPAP network may be deleted.

To join user device 604 to the TB network, the user device 604 may subsequently transmit its certificate to the controller device 102. The controller device 102 may join the TB network and transmit the token (including the certificate signed by the user device 604) to access device 104. Upon receipt, the access device 104 may be configured to add the token (e.g., UD certificate which is the public key of the user device 502 as digitally signed by its private key), the TB network's SSID, an authentication protocol to utilize (e.g., EAP-TLS), the access device certificate, and the expiration data received at 516, etc.) to an access database stored and maintained by the access device 104 and associated with the TB network's SSID. The user device 604 may then request to join the TB network. The request may include the token for user device 604. An authentication procedure may be performed by the access device 104 and the user device 604. This authentication procedure may be in accordance with the authentication protocol provided at 716. In some embodiments, the access device 104 may authenticate the user device 604 utilizing the token provided by the user device 604 during the authentication procedure against the store token associated with the user device 604 from the access database maintained by the access device 104. The user device 604 may be configured to receive the token (e.g., certificate) of the access device 104 and authenticate the access device 104 by comparing the received token to the token (e.g., the Access Device Certificate) provided and stored at 716. If both devices authenticate one another, the user device 604 may be granted access to the token-based network.

Figure 8:
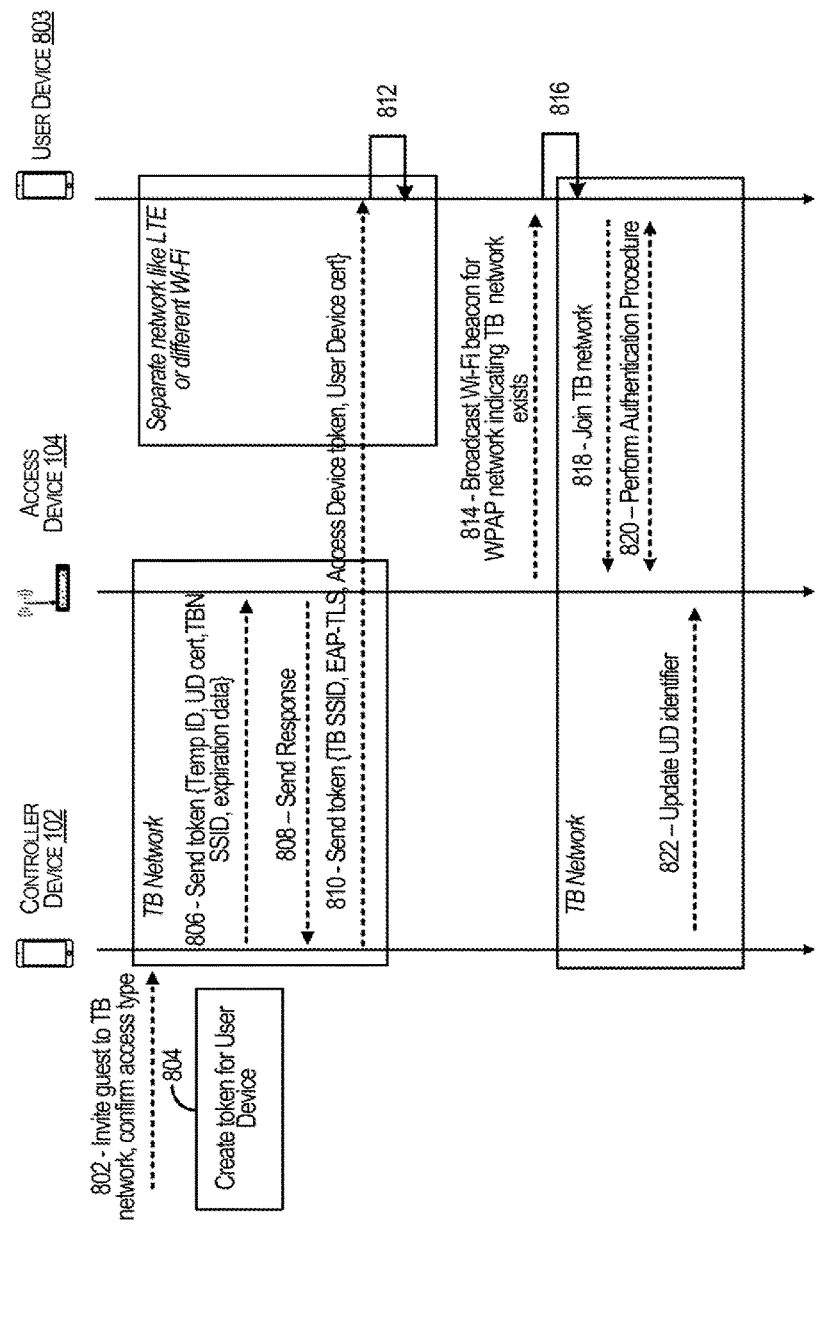
FIG. 8 is a flow diagram illustrating an exemplary process for providing network access by invitation, according to some embodiments.

FIG. 8 is a flow diagram illustrating an exemplary process 800 for providing network access by invitation, according to some embodiments. The controller device 102 may be associated with a user that has administrative privileges with respect to the networks of environment 100 of FIG. 1 (e.g., a home network).

The process may begin at 802, where the user may utilize any suitable interface provided on controller device 102 (e.g., via an application executing on controller device 102) to submit an invitation to a guest to join a token-based network. The user input received by the controller device 102 at 802 may include a mobile phone number, an email address, or any suitable contact data associated with the user of user device 604 and provided by the user of controller device 102.

At 804, the controller device 102 may be configured to generate a token for user device 803 (e.g., a mobile phone associated with a visiting guest). By way of example, the controller device 102 may generate a public (cryptographic) key and corresponding private (cryptographic) keys for the user device 803. The controller device 102 may digitally sign the public/private key with its own private key. The digitally signed data may be referred to as the user device's certificate). In some embodiments, the controller device 102 may request a token (or some portion of the token) from the service provider computer(s) 112 of FIG. 1. In those cases, the service provider computer(s) 112 may generate a public/private key pair for the user device 803, store the keys, digitally sign the keys using its own private key, and send them to the controller device 102 for subsequent use. The controller device 102 may extract the public/private keys using the public key of the service provider. The controller device 102 may store the generated public/private keys generated for user device 803. The controller device 102 may then generate a token from a temporary identifier generated by the controller device 102, the user device's certificate (as signed by the controller device 102 or the service provider), and the SSID of the token-based network. In some embodiments, the token may include expiration data indicating an expiration time and/or date, a period of time for which the token is valid, or an indication that the token does not expire.

At 806, the controller device 102 may transmit the token to user device 803.

At 808, the access device 104 may be configured to add the token to an access database stored and maintained by the access device 104 and associated with the TB network's SSID. The access database may be subsequently utilized by the access device 104 to make determinations as to whether an accessory device and/or user device is to be allowed access to a network (e.g., the token-based network). In some embodiments, the access device 104 may be configured to store and maintain multiple access databases corresponding to multiple token-based networks that are managed by the access device 104 or the access device 104 may store tokens corresponding to multiple token-based networks in a single access database. Upon receipt of the token, the access device 104 may generate an identifier for the user device 803. The access device 104 may send a response to the controller device 102 indicating the token of user device 803 was added to the TB access database. The response may include the identifier generated for the user device 803.

At 810, the controller device 102 may send network data such as the TB network's SSID, an authentication protocol to be utilized (e.g., EAP-TLS), the user device certificate as generated by the controller device 102 (e.g., the public/private key pair as signed by the private key of the controller device 102), and the token of the access device 104 (e.g., the certificate/the public key of the access device 104 as signed by the private key of the access device 104). In some embodiments, the user device certificate may instead be requested by the controller device 102 and generated by the service provider computer(s) 112 of FIG. 1. In these scenarios, the user device certificate provided by the controller device 102 at 810 may be the one generated originally by the service provider computer(s) 112. Once generated, the user device token may be added to a database of accessory devices store in local memory at the controller device 102.

It should be appreciated that the token may be sent by the controller device 102 utilizing any suitable electronic means. By way of example, the controller device 102 may utilize the user input received at 802 to format an electronic communication (e.g., an email, an SMS text message, a push notification, or the like) to include the token. The electronic communication may be sent (e.g., via a cellular network and/or another wireless network, such as the Internet) to the recipient specified and received at 802.

At 812, the user device 803 may store the received token in local memory.

At 814, the access device 104 may broadcast a Wi-Fi beacon for the WPAP network that indicates the existence of the TB network.

At 816, the user of the user device 803 may be prompted to confirm they wish to join the TB network. If confirmed, the process 800 may proceed to 818, else the process 800 may conclude.

At 818, the user device 803 may transmit a request to join the TB network to the access device 104. The request may include the token (or at least some portion of the token such as the TB SSID and the user device (UD) certificate). In some embodiments, the request may include an identifier for the user device 803.

At 820, the access device 104 and the user device 803 may exchange any suitable information according to any suitable authentication protocol (e.g., EAP-TLS) to authenticate one another. By way of example, the access device 104 may receive the user device's token (or at least a portion of the token, such as the TB SSID and the UD certificate) and authenticate the user device token against stored data (e.g., the token provided at 806). The user device 803 may authenticate the token of the access device 104 received from the access device 104 against the access device's stored token. If the devices authenticate one another (e.g., the received token matches the stored token on each device), the user device 803 may be granted access to the TB network.

At 822, at any suitable time after receiving the user device's identifier, the controller device 102 may transmit the user device identifier to the access device 104 to update the identifier associated with the user device 803 from the temporary identifier assigned by the controller device 102 to the identifier provided by the user device 803 at 818.

Figure 9:
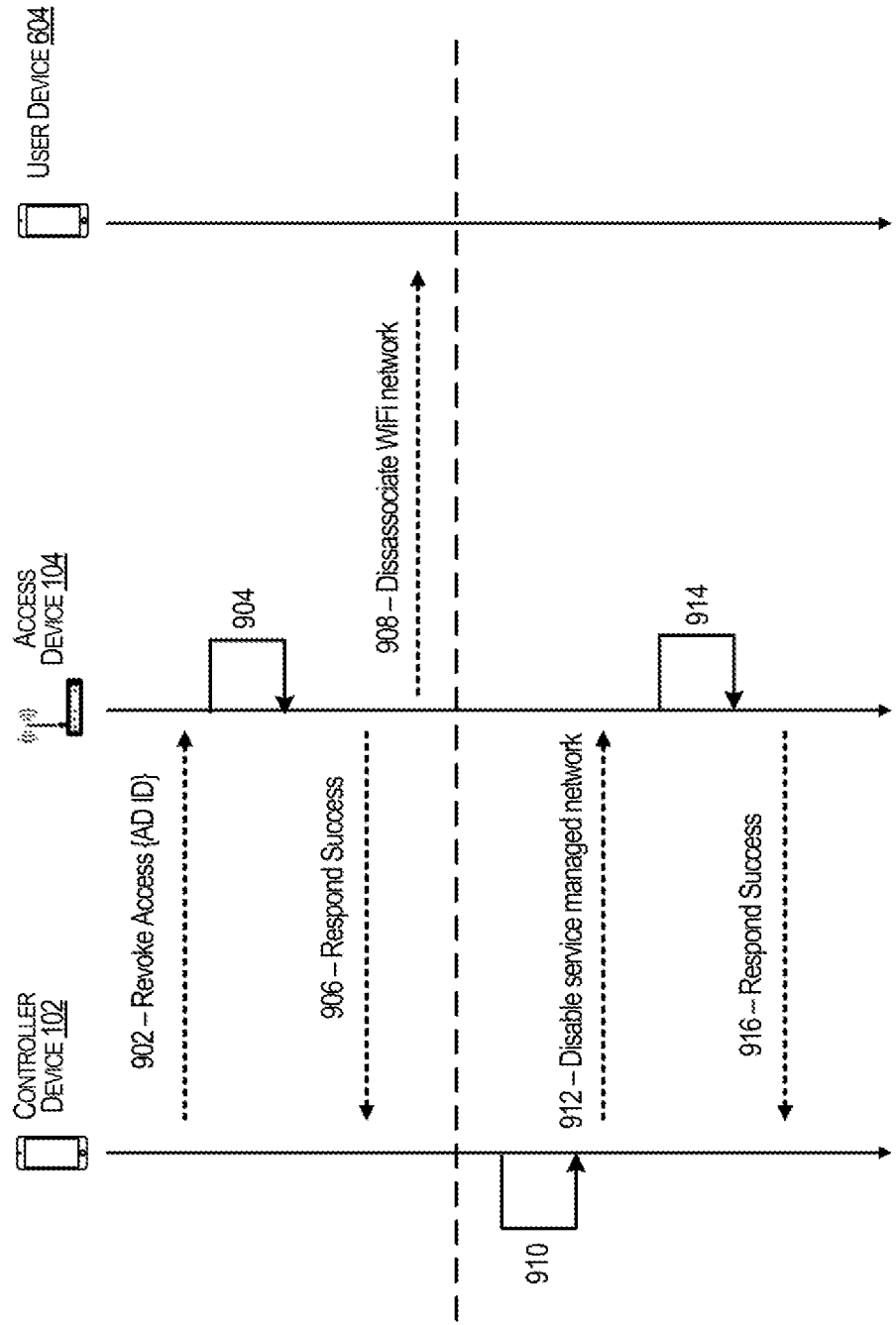
FIG. 9 is a flow diagram illustrating an exemplary process for disabling network access, according to some embodiments.

FIG. 9 is a flow diagram illustrating an exemplary process 900 for revoking and/or disabling network access, according to some embodiments.

The process 900 may begin at 902, where the controller device 102 may transmit a revocation message that indicates access to a TB network for user device 604 is to be revoked. In some embodiments, the revocation message may include any suitable data including, but not limited, to the user device identifier associated with the user device 604, the SSID of the network to which access is being revoked, the certificate associated with the user device 803, or any suitable portion of the token associated with the user device 803 that is stored in local memory (e.g., in the accessory database) at the controller device 102.

At 904, the access device 104 may receive the revocation message. In response, the access device 104 may delete the token corresponding to the user device 803 from the access database stored in local memory at the access device 104.

At 906, the access device 104, may send a message to user device 604 instructing the user device 604 to disassociate from the network corresponding to the SSID. In response, the user device 604 may disconnect from the network and delete any or all suitable network access data that was stored in local memory of the user device 604.

At 908, the access device 104 may transmit a response to the controller device 102 indicating the network access for user device 604 was successful/unsuccessful revoked. This information may be presented to the user via a display of the controller device 102.

At 910, the user may utilize an interface provided at the controller device 102 to disable one or more TB networks. As a non-limiting example, the user may indicate that the access device 104 is no longer to be used to manage TB networks.

At 912, in response to receiving user input 910, the controller device 102 may instruct, based on the user input, the access device 104 to disable a particular network (e.g., corresponding to an TB network's SSID) and/or all networks.

At 914, in response to receiving the message at 912, the access device 104 may be configured to set one or more network setting that will cause the access device 104 to disable any previously provisioned token-based networks. The access device 104 may delete all tokens stored in the access database. In some embodiments, the access device 104 may transmit a disassociate message to each affected accessory devices to cause the recipient accessory device to delete its stored token and to disassociate from the TB network with which it was connected.

At 916, the access device 104 may transmit a response to the controller device 102 indicating the TB networks previously managed by the access device 104 have been successfully/unsuccessfully disabled. This information may be presented to the user via a display of the controller device 102.

Figure 10:
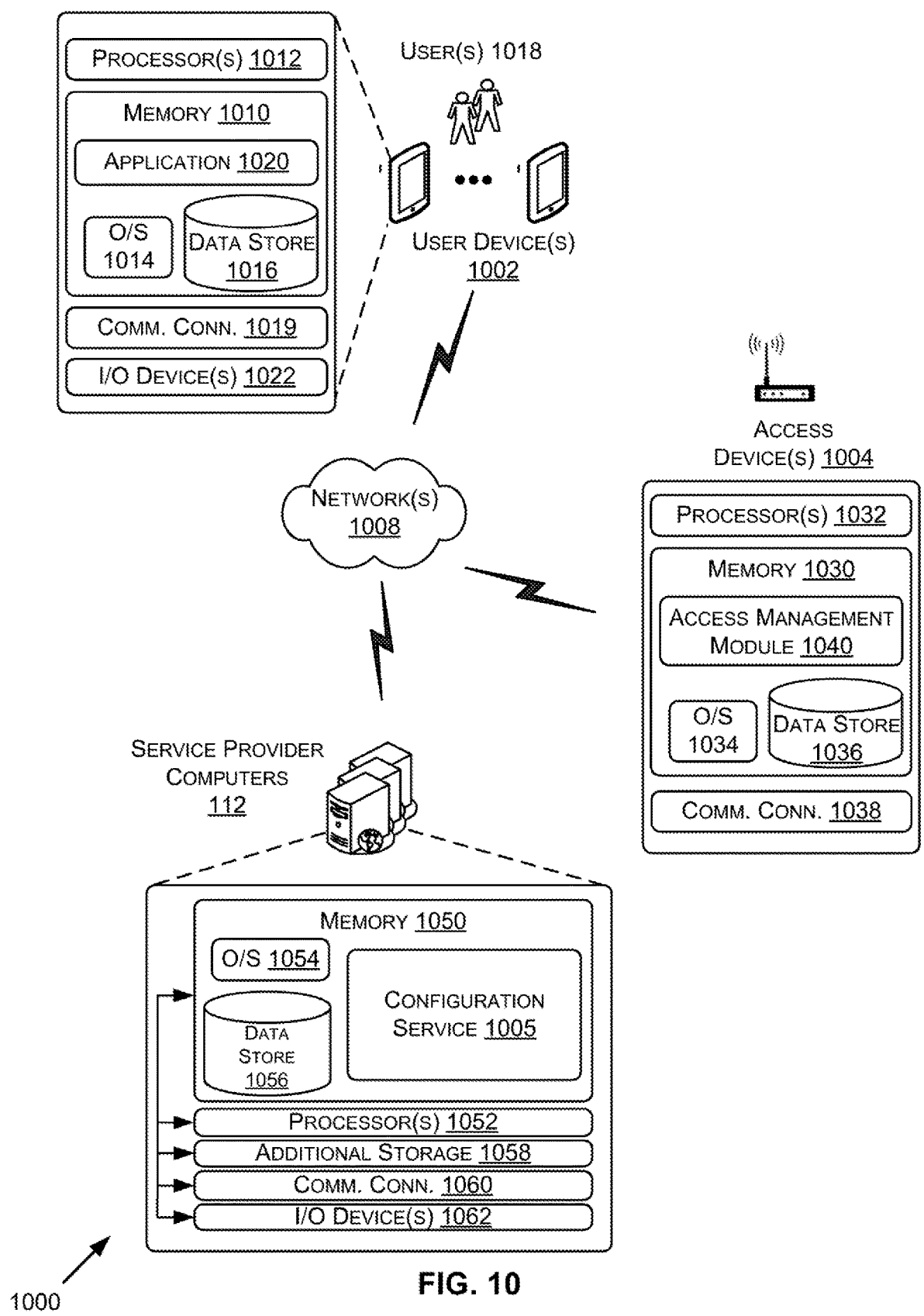
FIG. 10 is an example system architecture for implementing aspects of a configuration system, in accordance with at least one embodiment.

FIG. 10 is an example system architecture 1000 for implementing aspects of a configuration system, in accordance with at least one embodiment. The system 1000 may include service provider computer(s) 112, user device(s) 1002, and access device(s) 1004. The service provider computer(s) 112 may be configured to provide host configuration service 1005 discussed in more detail below.

The service provider computer(s) 112, the user device(s) 1002, and the access devices(s) 1004 may be in communication with one another via one or more network(s) 1008 (e.g., the networks 114-120 of FIG. 1). The accessory devices, user devices, and controller devices of FIGS. 1-9 may individually be examples of the user device(s) 1002.

In some examples, the network(s) 1006 may include any one or a combination of many different types of networks, such as cable networks, the Internet, wireless networks, cellular networks, and other private and/or public networks. For example, the network(s) 1008 may include a WAN (e.g., the Internet), and/or multiple LAN networks (e.g., the WPAP networks, token-based networks, BLE networks, cellular networks, etc.) discussed above in connection with FIGS. 1-9.

The user device(s) 1002 may be any suitable type of computing device such as, but not limited to, a mobile phone, a smartphone, a personal digital assistant (PDA), a laptop computer, a desktop computer, a television, a thin-client device, a tablet PC, an electronic book (e-book) reader, etc.

In one illustrative configuration, the user device(s) 1002 may include at least one memory 1010 and one or more processing units (or processor(s) 1012). The processor(s) 1012 may be implemented as appropriate in hardware, computer-executable instructions, firmware, or combinations thereof. Computer-executable instruction or firmware implementations of the processor(s) 1012 may include computer-executable or machine-executable instructions written in any suitable programming language to perform the various functions described.

The memory 1010 may store program instructions that are loadable and executable on the processor(s) 1012, as well as data generated during the execution of these programs. The memory 1010 may include an operating system 1014, one or more data stores 1016, and/or one or more application programs, modules, or services (e.g., application 1020) for implementing the features disclosed herein with respect to the figures above. In some embodiments, the application 1020 may provide the user device(s) 1002 access to the functionality of configuration service 1005. Depending on the configuration and type of user computing device, the memory 1010 may be volatile (such as random access memory (RAM)) and/or non-volatile (such as read-only memory (ROM), flash memory, etc.). The user device(s) 1002 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1010 may include multiple different types of memory, such as static random access memory (SRAM), dynamic random access memory (DRAM), or ROM.

The application 1020 may be utilized by the user(s) 1018 to perform any of the functionality described in connection with the controller devices, accessory devices, and/or user devices of FIGS. 1-9. In some examples, the service provider computer(s) 112, perhaps arranged in a cluster of servers or as a server farm, may host the application 1020 as part of a cloud-based configuration service (e.g., configuration service 1005). Other server architectures may also be used to host the application 1020 and/or cloud-based configuration service. The application 1020 may be capable of handling requests from the user(s) 1018 and serving, in response, various user interfaces that can be rendered at the user device(s) 1002.

The memory 1010 may store program instructions that are loadable and executable on the processor(s) 1012, as well as data generated during the execution of these programs. Depending on the configuration and type of service by the user device(s) 1002, the memory 1010 may be volatile (such as RAM) and/or non-volatile (such as ROM, flash memory, etc.). The user device(s) 1002 may also include additional storage (not depicted), which may include removable storage and/or non-removable storage. The storage may individually include, but are not limited to, magnetic storage, optical disks and/or tape storage. The disk drives and their associated computer-readable media may provide non-volatile storage of computer-readable instructions, data structures, program modules, and other data. In some implementations, the memories 1010 and additional storage may include multiple different types of memory, such as SRAM, DRAM, or ROM.

The memory 1010 and additional storage, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1010 and additional storage are examples of computer storage media. Additional types of computer storage media that may be present in the user device(s) 1002 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device(s) 1002 may also contain communications connection(s) 1019. The communication connection(s) 1019 may allow the user device(s) 1002 to communicate with a stored database, another user device or server, user terminals and/or other devices on the network(s) 1008. The user device(s) 1002 may also include I/O device(s) 1022. The I/O device(s) 1022 may include devices such as a keyboard, a mouse, a pen, a voice input device, a touch input device, a display, speakers, a printer, etc.

The access device(s) 1004 may be any suitable type of computing device configured to manage one or more networks such as a wireless router, a mesh network router, etc. In one illustrative configuration, the access device(s) 1004 may include at least one memory 1030 and one or more processing units (or processor(s) 1032). The processor(s) 1032 may be implemented as appropriate in hardware, computer-executable instructions, firmware, or combinations thereof. Computer-executable instruction or firmware implementations of the processor(s) 1032 may include computer-executable or machine-executable instructions written in any suitable programming language to perform the various functions described.

The memory 1030 may store program instructions that are loadable and executable on the processor(s) 1032, as well as data generated during the execution of these programs. The memory 1030 may include an operating system 1034, one or more data stores 1036, and/or one or more application programs, modules, or services (e.g., access management module 1040) for implementing the features disclosed herein with respect to access devices provided in the figures above. Depending on the configuration and type of device, the memory 1030 may be volatile (such as random access memory (RAM)) and/or non-volatile (such as read-only memory (ROM), flash memory, etc.). The access device(s) 1004 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1030 may include multiple different types of memory, such as static random access memory (SRAM), dynamic random access memory (DRAM), or ROM.

The access management module 1040 may be utilized by the access device(s) 1004 to perform any of the functionality described in connection with the access devices of FIGS. 1-9. In some examples, the service provider computer(s) 112, perhaps arranged in a cluster of servers or as a server farm, may be in communication with the access management module 1040 (e.g., via the configuration service 1005).

The memory 1030 may store program instructions that are loadable and executable on the processor(s) 1032, as well as data generated during the execution of these programs. Depending on the configuration and type of service by the access device(s) 1004, the memory 1030 may be volatile (such as RAM) and/or non-volatile (such as ROM, flash memory, etc.). The access device(s) 1004 may also include additional storage (not depicted), which may include removable storage and/or non-removable storage. The storage may individually include, but are not limited to, magnetic storage, optical disks and/or tape storage. The disk drives and their associated computer-readable media may provide non-volatile storage of computer-readable instructions, data structures, program modules, and other data. In some implementations, the memory 1030 and additional storage may include multiple different types of memory, such as SRAM, DRAM, or ROM.

The memory 1030 and additional storage, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1030 and additional storage are examples of computer storage media. Additional types of computer storage media that may be present in the access device(s) 1004 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The access device(s) 1004 may also contain communications connection(s) 1038. The communication connection(s) 1038 may allow the access device(s) 1004 to communicate with a stored database, another user device or server, user terminals and/or other devices on the network(s) 1008.

The service provider computer(s) 112 may be any suitable type of computing device configured to provide the functionality discussed above in connection with a configuration service (e.g., the configuration service 1005. In one illustrative configuration, the service provider computer(s) 112 may include at least one memory 1050 and one or more processing units (or processor(s) 1052). The processor(s) 1052 may be implemented as appropriate in hardware, computer-executable instructions, firmware, or combinations thereof. Computer-executable instruction or firmware implementations of the processor(s) 1052 may include computer-executable or machine-executable instructions written in any suitable programming language to perform the various functions described.

The memory 1050 may store program instructions that are loadable and executable on the processor(s) 1052, as well as data generated during the execution of these programs. The memory 1050 may include an operating system 1054, one or more data stores 1056, and/or one or more application programs, modules, or services (e.g., the configuration service 1005) for implementing the features disclosed herein with respect to the service provider computer(s) provided in the figures above. In some examples, the service provider computer(s) 112, perhaps arranged in a cluster of servers or as a server farm, may be in communication with the access management module 1040 and/or the application 1020. Depending on the configuration and type of device, the memory 1050 may be volatile (such as random access memory (RAM)) and/or non-volatile (such as read-only memory (ROM), flash memory, etc.). The service provider computer(s) 112 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1050 may include multiple different types of memory, such as static random access memory (SRAM), dynamic random access memory (DRAM), or ROM.

The memory 1050 may store program instructions that are loadable and executable on the processor(s) 1052, as well as data generated during the execution of these programs. Depending on the configuration and type of service by the service provider computer(s) 112, the memory 1050 may be volatile (such as RAM) and/or non-volatile (such as ROM, flash memory, etc.). The service provider computer(s) 112 may also include additional storage 1058, which may include removable storage and/or non-removable storage. The storage may individually include, but are not limited to, magnetic storage, optical disks and/or tape storage. The disk drives and their associated computer-readable media may provide non-volatile storage of computer-readable instructions, data structures, program modules, and other data. In some implementations, the memory 1050 and additional storage 1058 may include multiple different types of memory, such as SRAM, DRAM, or ROM.

The memory 1050 and additional storage 1058, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1050 and additional storage 1058 are examples of computer storage media. Additional types of computer storage media that may be present in the service provider computer(s) 112 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 112 may also contain communications connection(s) 1060. The communication connection(s) 1060 may allow the service provider computer(s) 112 to communicate with a stored database, a user device or another server, an access device, user terminals and/or other devices on the network(s) 1008. The service provider computer(s) 112 may also include I/O device(s) 1062. The I/O device(s) 1062 may include devices such as a keyboard, a mouse, a pen, a voice input device, a touch input device, a display, speakers, a printer, etc.

Figure 11:
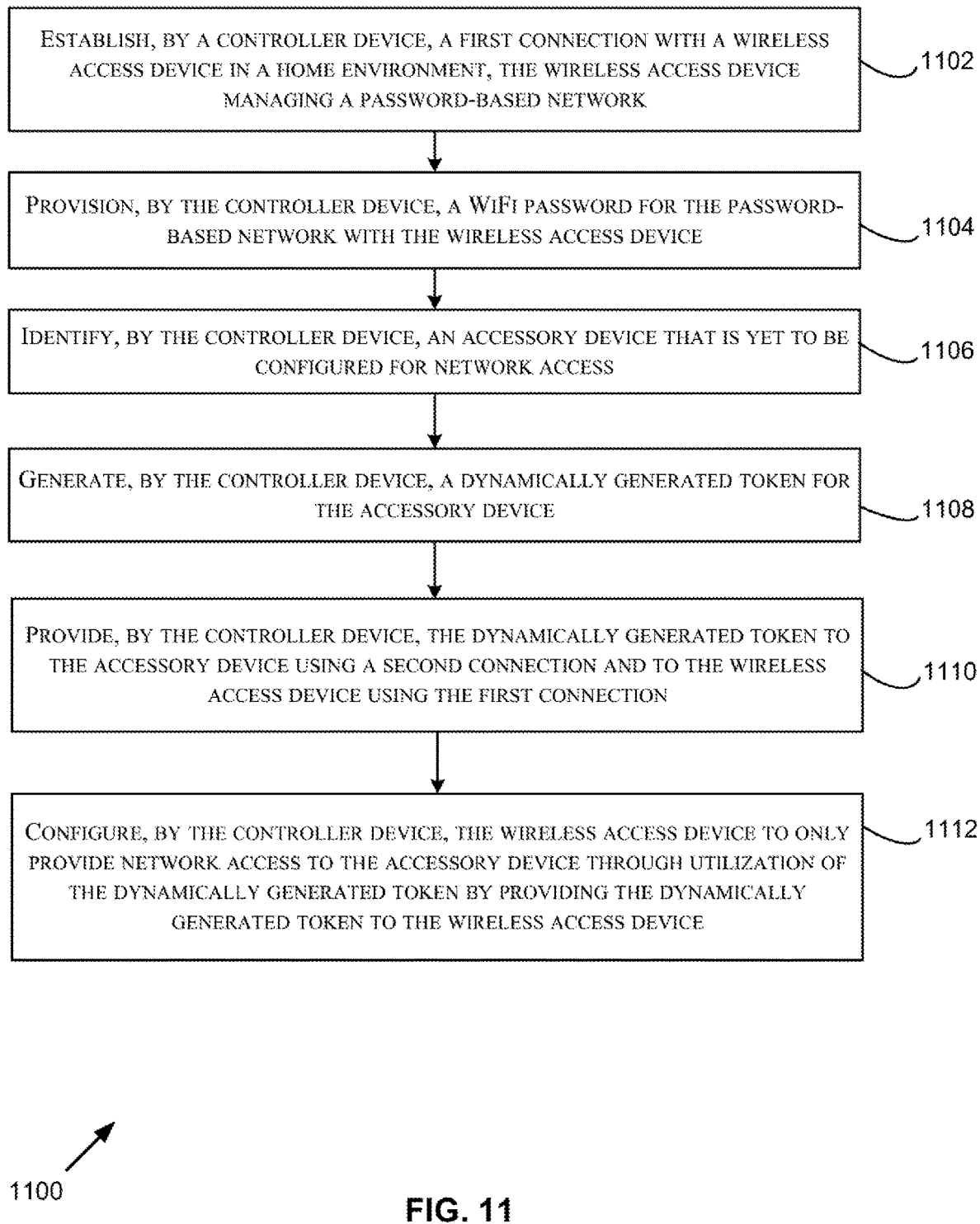
FIG. 11 is a flow diagram illustrating an exemplary method for providing network access utilizing the configuration system of FIG. 10, according to some embodiments.

FIG. 11 is a flow diagram illustrating an exemplary method 1100 for providing network access utilizing the configuration system of FIG. 10, according to some embodiments. The method 1100 may performed in any suitable order. It should be appreciated that the method 1100 may include a greater number or a lesser number of steps than that depicted in FIG. 11.

The method may begin at 1102, where a controller device (e.g., the controller device 102 of FIGS. 1-9) may establish a first connection with the wireless access device in a home environment (e.g., the environment 100 of FIG. 1). By way of example, the controller device may establish a first connection with a wireless router via wireless communications protocol (e.g., via Bluetooth®, a Bluetooth Low Energy® protocol, WiFi, etc.) as illustrated at 216 of FIG. 2. In some embodiments, the wireless access device may be configurable to manage a password-based network (e.g., the WPAP network of the above figures).

At 1104, the controller device may provision a WiFi password for the password-based network with the wireless access device. As a non-limiting example, the controller device 102 provisioning the access device (e.g., the access device 104 of FIGS. 1-9) with a WiFi password as illustrated at 222 of FIG. 2.

At 1106, the controller device may identify an accessory device (e.g., accessory device 402 of FIG. 4) that is yet to be configured for network access. For example, the controller device 102 may identify that accessory device 402 has not been configured based at least in part on receiving a broadcasted WiFi beacon indicating a setup request as depicted at 414 of FIG. 4.

At 1108, the controller device may generate a dynamically generated token for the accessory device. By way of example, the controller device 102 may generate a public (cryptographic) key and corresponding private (cryptographic) keys for the accessory device 402. The controller device 102 may digitally sign the public/private key with its own private key (referred to as the accessory device's certificate). The controller device 102 may store the public/private keys generated for accessory device 402. The controller device 102 may then generate a token from a temporary identifier generated by the controller device 102, the accessory device's certificate (as signed by the controller device 102), and the SSID of the token-based network. As depicted at 406 of FIG. 4, the token may include expiration data indicating an expiration time and/or date, a period of time for which the token is valid, or an indication that the token does not expire, etc.

At 1110, the controller device may provide the dynamically generated token to the accessory device using a second connection (e.g., a BLE connection) and to the wireless access device using the first connection.

At 1112, the controller device may configure the wireless access device to only provide network access to the accessory device through utilization of the dynamically generated token by providing the dynamically generated token to the wireless access device. By way of example, the access device 104 may receive the token from controller device 102 (as depicted at 426 of FIG. 4). The wireless access device may be configured to add the token (e.g., the controller device ID, the public key of the controller device 102 as digitally signed by its private key, the expiration data, etc.) to an access database stored and maintained by the access device 104 and associated with the token-based network's SSID as described at 430 of FIG. 4. The access database may be subsequently utilized by the access device 104 to make determinations as to whether a device is to be allowed access to a network (e.g., the token-based network). If the token provided by the accessory device does not match the token stored in the access database, the access device 104 may deny the accessory device access to the token-based network.

Figure 12:
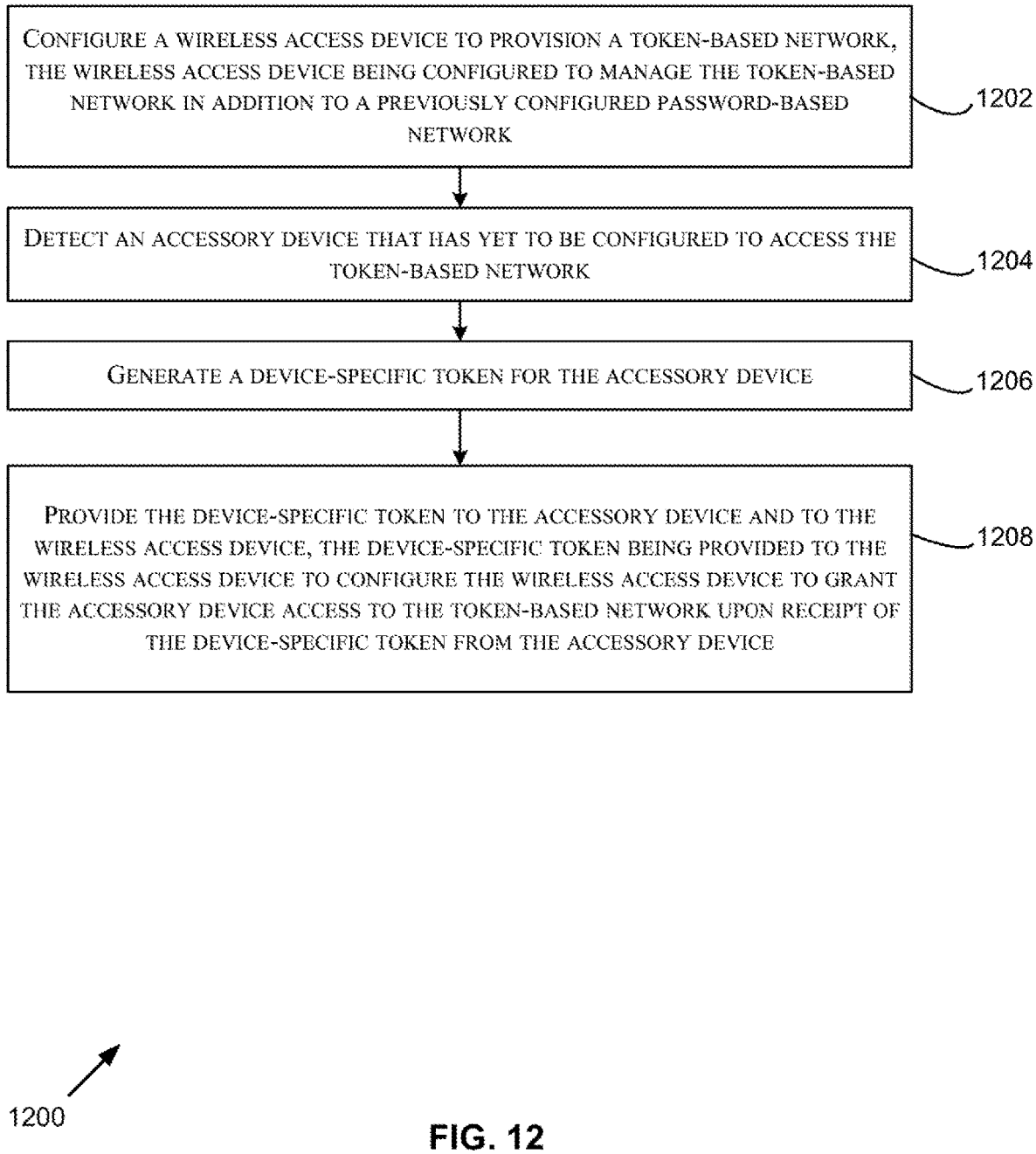
FIG. 12 is a flow diagram illustrating an exemplary method for providing network access utilizing the configuration system of FIG. 10, according to some embodiments.

FIG. 12 is a flow diagram illustrating an exemplary method 1200 for providing network access utilizing the configuration system of FIG. 10, according to some embodiments. The method 1200 may performed in any suitable order. The method 1200 may be performed by a controller device (e.g., the controller device 102 of FIGS. 1-9) comprising one or more processors in communication with one or more memories, the one or more processors configured to execute computer-executable instructions stored on the one or more memories to cause the controller device to perform the method 1200. It should be appreciated that the method 1200 may include a greater number or a lesser number of steps than that depicted in FIG. 12.

The method 1200 may begin at 1202, where the controller device may configure a wireless access device to provision a token-based network. By way of example, the controller device may configure the wireless access device utilizing the process described above in connection with FIG. 2. In some embodiments, the wireless access device being configured to manage the token-based network in addition to a previously configured password-based network as depicted in FIG. 2.

At 1204, the controller device may detect an accessory device that has yet to be configured. For example, the controller device 102 may detect that accessory device 402 of FIG. 4 has yet to be configured based at least in part on receiving a broadcast Wi-Fi beacon as described above in connection with 414 of FIG. 4.

At 1206, the controller device may generate a device-specific token for the accessory device. By way of example, the controller device 102 may generate a public (cryptographic) key and corresponding private (cryptographic) keys for the accessory device 402. The controller device 102 may digitally sign the public/private key with its own private key (referred to as the accessory device's certificate). The controller device 102 may store the public/private keys generated for accessory device 402. The controller device 102 may then generate a token from a temporary identifier generated by the controller device 102, the accessory device's certificate (as signed by the controller device 102), and the SSID of the token-based network. As depicted at 406 of FIG. 4, the token may include expiration data indicating an expiration time and/or date, a period of time for which the token is valid, or an indication that the token does not expire, etc.

At 1208, the controller device 102 may provide the device-specific token to the accessory device and to the wireless access device. By way of example, the controller device 102 may provide the token to a wireless access device (e.g., the access device 104) at 406 of FIG. 4. The controller device 102 may provide the token to the accessory device (e.g., the accessory device 402 of FIG. 4) as depicted at 426 of FIG. 4). In some embodiments, the device-specific token may be provided to the wireless access device to configure the wireless access device to grant the accessory device access to the token-based network upon receipt of the device-specific token from the accessory device. For example, providing the token to the wireless access device may cause the wireless access device to store the token in local memory. When the accessory device 402 later provides its device-specific token, the wireless access device 104 may compare the token provided to the one stored in local memory (e.g., in the access database). If the token's match, the wireless access device may grant the accessory device access to the token-based network. Else, the wireless access device may deny the accessory device's request to join the token-based network.

Illustrative methods, computer-readable media, and systems for providing network access tokens for accessory and/or user devices are described above. Some or all of these systems and methods may, but need not, be implemented at least partially by architectures such as those describes above. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

As described above, one aspect of the present technology is the gathering and use of data (e.g., a user's network password) to assist providing more secure token-based networks. The present disclosure recognizes that the use of such personal information, in the present technology, can be used to the benefit of users. The present disclosure contemplates that those entities responsible for the collection, analysis, disclosure, transfer, storage, or other use of such personal information will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information. That is, the present disclosure contemplates that hardware and/or software elements can be provided to prevent or block access to such personal information data. For example, such as in the case of network passwords, the present technology can be configured to allow users to select to "opt in" or "opt out" of participation in the collection and/or delivery of such personal information. In another example, users can select not to provide their personal information. In yet another example, users can select to limit the amount of personal information that is provided, thus enabling some, but not all, of the personal information to be shared. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    establishing, by a controller device, a first connection with a wireless access device in a home environment, the wireless access device managing a password-based network;
    provisioning, by the controller device, a WiFi password for the password-based network with the wireless access device;
    identifying, by the controller device, an accessory device that is yet to be configured for network access;
    generating, by the controller device, a dynamically generated token for the accessory device;
    providing, by the controller device, the dynamically generated token to the accessory device using a second connection and to the wireless access device using the first connection;
    instructing, by the controller device, the accessory device to utilize a token-based network provided by the wireless access device based at least in part on the providing of the dynamically generated token to the accessory device; and
    configuring, by the controller device, the wireless access device to provide the network access to the accessory device via the token-based network through utilization of the dynamically generated token based at least in part on the providing of the dynamically generated token to the wireless access device.

2. The method of claim 1, wherein configuring the wireless access device to provide network access configures the wireless access device to provide the network access corresponding to a second network managed by the wireless access device, the second network being the token-based network is configured for token-based authentication.

3. The method of claim 1, further comprising:
generating one or more dynamically generated tokens corresponding to one or more accessory devices previously granted access to the password-based network; and
providing the one or more dynamically generated tokens to the one or more accessory devices and the wireless access device, wherein providing the one or more dynamically generated tokens to the one or more accessory devices causes each of the one or more accessory devices to interact with the wireless access device utilizing a respective dynamically generated token of the one or more dynamically generated tokens to gain respective network access to the password-based token-based network.

4. The method of claim 1, further comprising configuring, by the controller device, the wireless access device to provision the token-based network, wherein configuring the wireless access device to manage the token-based network comprises causing the wireless access device to enable a network setting in local memory.

5. The method of claim 4, wherein providing the dynamically generated token to the accessory device causes the accessory device to transmit a message to the wireless access device to join the token-based network.

6. The method of claim 5, wherein providing the dynamically generated token to the accessory device further comprises providing, to the accessory device, a service set identifier corresponding to the token-based network.

7. The method of claim 1, further comprising:
receiving, by the controller device, user input related to generating the dynamically generated token, the user input specifying expiration data associated with the dynamically generated token; and
transmitting, by the controller device, the expiration data with the dynamically generated token to the wireless access device to cause the dynamically generated token to be revoked based at least in part on the expiration data.

8. The method of claim 1, further comprising:
receiving, by the controller device, user input indicating a desire to revoke the dynamically generated token; and
transmitting, by the controller device, a revocation message to the wireless access device to cause the wireless access device to revoke the network access of the accessory device corresponding to the dynamically generated token.

9. A controller device, comprising:
one or more processors in communication with one or more memories, the one or more processors configured to execute computer-executable instructions stored on the one or more memories to cause the controller device to:
configure a wireless access device to provision a token-based network, the wireless access device being configured to manage the token-based network in addition to a previously configured password-based network;
detect an accessory device that has yet to be configured to access the token-based network wireless access device;
generate a device-specific token for the accessory device;
provide the device-specific token to the accessory device and to the wireless access device;
instruct the accessory device to utilize a token-based network provided by the wireless access device based at least in part on the providing of the dynamically generated token to the accessory device; and
configure the wireless access device to provide network access to the accessory device via the token-based network through utilization of the device-specific token, the device-specific token being provided to the wireless access device to configure the wireless access device to grant the accessory device access to the token-based network upon receipt of the device-specific token from the accessory device.

10. The controller device of claim 9, wherein execution of the computer-executable instructions further causes the controller device to receive user input indicating an invitation to the accessory device to join the token-based network, wherein providing the device-specific token comprises transmitting an electronic message accessible by the accessory device in response to the user input, and wherein the device-specific token is generated for the accessory device and transmitted in the electronic message in response to receiving the user input.

11. The controller device of claim 9, wherein the wireless access device is configured to manage a plurality of token-based networks comprising the token-based network.

12. The controller device of claim 9, wherein the wireless access device is configured to provision the token-based network in response to receiving the device-specific token.

13. The controller device of claim 12, wherein the wireless access device is configured to determine one or more additional accessory devices associated with the accessory device, and wherein the wireless access device is configured to grant access to the token-based network only to the accessory device and the one or more additional accessory device associated with the accessory device.

14. A computer-readable storage medium storing computer-executable instructions that, when executed by one or more processors of a controller device, configure the controller device to:
configure a wireless access device to provision a token-based password-based network;
generate a network access token for an accessory device to enable network access for the accessory device to the token-based network from the wireless access device;
provide the network access token to the wireless access device, the wireless access device being configured to store the network access token in local memory; and
provide the network access token to the accessory device;
instructing the accessory device to utilize a token-based network provided by the wireless access device based at least in part on the providing of the dynamically generated token to the accessory device; and
configure the wireless access device to provide the network access to the accessory device via the token-based network through utilization of the network access token, the accessory device being configured to request the network access from the wireless access device by providing the network access token, and the wireless access device being further configured to grant the network access based on a comparison between the network access token as stored in the local memory and the network access token provided by the accessory device.

15. The computer-readable storage medium of claim 14, wherein executing the computer-executable instructions further configures the controller device to:
receive user input identifying an expiration time associated with the network access token, the network access token being generated in response to receiving the user input; and transmit the expiration time to the wireless access device, the wireless access device being configured to revoke the network access for the accessory device when the expiration time is reached.

16. The computer-readable storage medium of claim 15, wherein the wireless access device revokes the network access by:
    deleting the network access token from local memory; and
    transmitting a disassociate message to the accessory device to cause the accessory device to delete the network access token and to disconnect from the token-based network.

17. The computer-readable storage medium of claim 14, wherein the wireless access device is configured to ensure that only the accessory device, and no other accessory device devices, is granted access to the token-based network.

18. The computer-readable storage medium of claim 14, wherein executing the computer-executable instructions further configures the controller device to:
    transmit the network access token to a service provider computer configured to execute a configuration service;
    receive user input indicating that the wireless access device is being replaced with a new wireless access device; and
    transmit, to the service provider computer, an indication that the wireless access device is being replaced with a new wireless access device, the new wireless access device being configured to provide only a second password-based network, whereby the service provider computer is configured to facilitate migrating the accessory device from the token-based network to the password-based network provided by the new wireless access device.

19. The computer-readable storage medium of claim 14, wherein the network access token comprises an accessory device identifier, a service set identifier corresponding to the token-based network, a token associated with the wireless access device, and an expiration data associated with the network access to be provided to the accessory device.

20. The computer-readable storage medium of claim 14, wherein transmitting the network access token to the accessory device causes the accessory device to generate a modified network access token utilizing the network access token and digitally signed data generated by the accessory device, and wherein network access is obtained utilizing the modified network access token.

* * * * *